United States Patent
Nogawa

(10) Patent No.: US 8,559,288 B2
(45) Date of Patent: Oct. 15, 2013

(54) OPTICAL DISK RECORDING DEVICE, RECORDING DATA TRANSMISSION METHOD, AND SEMICONDUCTOR DEVICE

(75) Inventor: Hiromichi Nogawa, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

(21) Appl. No.: 13/485,294

(22) Filed: May 31, 2012

(65) Prior Publication Data

US 2012/0307618 A1    Dec. 6, 2012

(30) Foreign Application Priority Data

Jun. 3, 2011   (JP) ................... 2011-125362

(51) Int. Cl.
*G11B 7/00*   (2006.01)

(52) U.S. Cl.
USPC ............... 369/59.23; 369/59.11; 369/59.13; 369/59.2; 369/47.19

(58) Field of Classification Search
None
See application file for complete search history.

(56) References Cited

U.S. PATENT DOCUMENTS

| 5,528,236 | A | * | 6/1996 | Shimpuku et al. ............... 341/59 |
| RE42,962 | E | * | 11/2011 | Yonemitsu et al. ......... 369/275.3 |
| 2009/0103406 | A1 | | 4/2009 | Kitayama et al. |
| 2009/0310458 | A1 | | 12/2009 | Nishimura et al. |

FOREIGN PATENT DOCUMENTS

| JP | 2009-99233 A | 5/2009 |
| JP | 2009-283095 A | 12/2009 |

* cited by examiner

*Primary Examiner* — Muhammad N Edun
(74) *Attorney, Agent, or Firm* — Miles & Stockbridge P.C.

(57) ABSTRACT

Provided is an optical disk recording device including: a recording pulse information generation unit that generates, from a recording signal, recording pulse information corresponding to a power level of laser light; a recording code generation unit that generates a recording code by encoding the recording pulse information; and a decoded code generation unit that decodes the recording code. The recording code generation unit generates the recording code based on a cyclic cede representing each transmission of the power level by using a Gray code. The decoded code generation unit decodes the recording code by using a recording code corresponding to a power level at a predetermined timing and a recording code corresponding to a power level immediately prior to the power level at the predetermined timing.

24 Claims, 25 Drawing Sheets

| RECORDING PULSE INFORMATION (PK2, PK1, WR, BS, HF) | POWER LEVEL | RECORDING CODE (RC1, RC2) | CYCLIC CODE |
|---|---|---|---|
| (0, 0, 0, 1, 1) | HIGH-FREQUENCY WAVEFORM SUPERPOSITION | (0, 1) | 01 |
| (0, 0, 0, 1, 0) | ER | (1, 1) | 11 |
| (1, 1, 1, 1, 0) | OV | (1, 0) | 10 |
| (0, 0, 1, 1, 0) | MD | (1, 1) | 11 |
| (0, 1, 1, 1, 0) | LP | (0, 1) | 01 |
| (0, 0, 0, 0, 0) | CL | (0, 0) | 00 |

Fig. 5

| RECORDING PULSE INFORMATION (PK2, PK1, WR, BS, HF) | POWER LEVEL | RECORDING CODE (RC1, RC2) |
|---|---|---|
| (0, 0, 0, 1, 1) | HIGH-FREQUENCY WAVEFORM SUPERPOSITION | (A, B) |
| (0, 0, 0, 1, 0) | ER | ($\bar{A}$, B) |
| (1, 1, 1, 1, 0) | OV | ($\bar{A}$, $\bar{B}$) |
| (0, 0, 1, 1, 0) | MD | ($\bar{A}$, B) |
| (0, 1, 1, 1, 0) | LP | (A, B) |
| (0, 0, 0, 0, 0) | CL | (A, $\bar{B}$) |

"A" AND "B" ARE LOGICAL VALUES OF "0" OR "1"

Fig. 6

| DECODED CODE 20 | | POWER LEVEL | POWER DATA |
| --- | --- | --- | --- |
| 4 BITS | HEXADECIMAL | | |
| (0, 0, 0, 1) | 1 | HIGH-FREQUENCY WAVEFORM SUPERPOSITION | LV1HF |
| (0, 1, 1, 1) | 7 | ER | LV1 |
| (1, 1, 1, 0) | E | OV | LV4 |
| (1, 0, 1, 1) | B | MD | LV2 |
| (1, 1, 0, 1) | D | LP | LV3 |
| (0, 1, 0, 0) | 4 | CL | LV0 |
| (1, 0, 0, 0) | 8 | | |

Fig. 7

| RECORDING PULSE INFORMATION (PK2, PK1, WR, BS, MP) | POWER LEVEL | OUTPUT CODE | RECORDING CODE (RC1, RC2) | CYCLIC CODE |
|---|---|---|---|---|
| (0, 0, 0, 0, 0) | CL | OUTPUT CODE 0 | (0, 0) | 00 |
| (0, 0, 0, 1, 0) | ER | OUTPUT CODE 1 | (0, 1) | 01 |
| (0, 0, 1, 1, 0) | MD | OUTPUT CODE 2 | (1, 0) | 10 |
| (1, 1, 1, 1, 0) | OV | OUTPUT CODE 3 | (1, 1) | 11 |
| (1, 1, 1, 1, 1) | OV | CONTINUATION CODE | (1, 1) → (0, 1) | 11→01 |
| (0, 1, 1, 1, 0) | LP | CONTINUATION CODE | (1, 1) → (0, 1) | 11→01 |

Fig. 17

| RECORDING PULSE INFORMATION (PK2, PK1, WR, BS, MP) | POWER LEVEL | OUTPUT CODE | OUTPUT PATTERN 1 RECORDING CODE (RC1, RC2) | OUTPUT PATTERN 2 RECORDING CODE (RC1, RC2) |
|---|---|---|---|---|
| (0, 0, 0, 0, 0) | CL | OUTPUT CODE 0 | (A, B) | (A, B) |
| (0, 0, 0, 1, 0) | ER | OUTPUT CODE 1 | (A, $\overline{B}$) | ($\overline{A}$, B) |
| (0, 0, 1, 1, 0) | MD | OUTPUT CODE 2 | ($\overline{A}$, B) | (A, $\overline{B}$) |
| (1, 1, 1, 1, 0) | OV | OUTPUT CODE 3 | ($\overline{A}$, B) | ($\overline{A}$, B) |
| (1, 1, 1, 1, 1) | OV | CONTINUATION CODE | ($\overline{A}$, $\overline{B}$) → (A, $\overline{B}$) | ($\overline{A}$, $\overline{B}$) → (A, $\overline{B}$) |
| (0, 1, 1, 1, 0) | LP | CONTINUATION CODE | ($\overline{A}$, $\overline{B}$) → (A, $\overline{B}$) | ($\overline{A}$, $\overline{B}$) → (A, $\overline{B}$) |

Fig. 18

| EXTENSION CODE 19 | | DECODED CODE 20 | | POWER LEVEL |
|---|---|---|---|---|
| 4 BITS | HEXADECIMAL | 4 BITS | HEXADECIMAL | |
| (0, 0, 0, 1) | 1 | (0, 0, 0, 1) | 1 | ER |
| (0, 1, 1, 1) | 7 | (0, 1, 1, 1) | 7 | OV |
| (1, 1, 1, 0) | E | (1, 1, 1, 0) | E | MD |
| (1, 0, 1, 1) | B | (1, 0, 1, 1) | B | LP |
| (0, 1, 0, 0) | 4 | (0, 1, 0, 0) | 4 | CL |
| (1, 0, 0, 0) | 8 | (1, 0, 0, 0) | 8 | |
| (1, 1, 0, 1) | D | PRECEDING EXTENSION CODE | | PRECEDING POWER LEVEL |

Fig. 22

OPTICAL DISK RECORDING DEVICE, RECORDING DATA TRANSMISSION METHOD, AND SEMICONDUCTOR DEVICE

CROSS-REFERENCE TO RELATED APPLICATIONS

This application is based upon and claims the benefit of priority from Japanese patent application No. 2011-125362, filed on Jun. 3, 2011, the disclosure of which is incorporated herein in its entirety by reference.

BACKGROUND

The present invention relates to an optical disk recording device and a recording signal transmission method. In particular, the present invention relates to an optical disk recording device and a recording signal transmission method that record information corresponding to a recording signal onto a recording medium by using laser light.

Optical disk recording devices typified by CDs (Compact Discs), DVDs (Digital Versatile Discs), and BDs (Blue-ray Discs) irradiate a recording medium (recording optical disk) with pulse-like laser light (hereinafter, also referred to as "recording pulse") according to a recording signal, and records information by forming recording marks on the recording film of the recording medium. This pulse-like laser light is generated such that a laser diode driver (hereinafter, LDD) mounted in an optical pickup (CPU) drives a laser diode based on recording pulse information indicating a power level corresponding to a laser drive current and a timing tor radiating the laser light.

In each optical disk recording device, it is necessary to optimize the recording pulse depending on recording conditions such as the type of recording media, recording marks and the length of an interval (space) between the recording marks, and a recording rate. For this reason, a technique called "recording strategy" is used in which the power level of laser light is multi-valued and each edge change point of recording pulses is controlled to be small.

In recent years, in the technical field of optical disk recording devices, there is an increasing demand for lower power-consumption, downsizing, and reduction in cost, along with a higher recording rate and an increase in the number of optical disk recording devices to be mounted on portable devices. On the other hand, the recording pulse information is generated by a signal processing LSI mounted on a substrate of an optical disk recording device, and is successively transmitted to an LDD through a flexible cable by using a low voltage differential signal (hereinafter, LVDS). Additionally, in recent years, multi-value recording power levels are used, with the result that the recording pulse information to be transmitted from the signal processing LSI to the LDD is increased, which necessitates a multi-channel transmission line.

An increase in the number of channels of a transmission line hinders the miniaturization of the optical disk recording device. In general, an LVDS transmission circuit constantly uses a current of 3.5 mA per channel, which hinders the reduction in power consumption. Furthermore, while the frequency of the recording pulse information is also increased along with a higher recording rate, the transmission band is limited by the flexible cable, which hinders the improvement in the recording rate.

Japanese Unexamined Patent Application Publication No. 2009-99233 discloses a technique relating to an optical disk recording device that improves an error rate and achieves high-quality recording. FIG. 23 is a block diagram illustrating the optical disk recording device disclosed in Japanese Unexamined Patent Application Publication No. 2009-99233. The optical disk recording device disclosed in Japanese Unexamined Patent Application Publication No. 2009-99233 includes a circuit board 81, a transmission line 86, and an optical pickup 88.

The circuit board 81 includes a signal processing integrated circuit device (DSP) 82 that includes a write strategy generation circuit 83 and low voltage differential signal (LVDS) driver circuits 84 for transmitting generated write strategy signals. The optical pickup 88 includes a laser diode (LD) 91 and a laser diode driver (LDD) 89 that drives the laser diode 91. The LDD 89 includes a plurality of current sources 90. The DSP 82 included in the circuit board 81 and the LDD 89 included in the optical pickup 88 are connected together with the transmission line 86 for transmitting the write strategy signals. Differential resistors 85 are provided between differential lines at the outputs of the LVDS driver circuits 84. The LDD 89 supplied with the write strategy signals is provided with terminal resistors 87.

In the optical disk recording device disclosed in Japanese Unexamined Patent Application Publication No. 2009-99233, the provision of the differential resistors 85 between the differential lines at the outputs of the LVDS driver circuits 84 enables reduction in reflected wave generated due to an impedance mismatch of the transmission line 86. This makes it possible to provide an optical disk recording device that can improve the error rate and achieve high-quality recording.

Japanese Unexamined Patent Application Publication No. 2009-283095 discloses a technique relating to an optical disk recording device capable of reducing the number of transmission lines upon transmission of recording pulse information to a laser driver and providing high-speed recording and stable recording performance.

FIG. 24 is a block diagram showing the optical disk recording device disclosed in Japanese Unexamined Parent Application Publication No. 2009-283095. The optical disk recording device disclosed in Japanese Unexamined Patent Application Publication No. 2009-283095 includes a signal processing LSI (108), a transmission line 103, and a laser driver 104. The signal processing LSI (108) includes a recording strategy table memory 314, a recording strategy generation circuit 315, a mark/space determination circuit 120, a modulation circuit 316, an encode circuit 100, a conversion table memory 101, and an LVDS transmission circuit 102.

The laser driver 104 includes an LVDS reception circuit 105, a conversion table memory 106, a decode circuit 107, an HF generation circuit 319, a current source circuit 304, and switches 305 to 309. The laser diode 302 is driven by the laser driver 104. Then, laser light is applied to an optical disk 300, which is rotated by a spindle 301, to thereby record information onto the optical disk 300.

In the optical disk recording device shown in FIG. 24, when recording data is supplied from an upper-level host 318 to the modulation circuit 316, a recording signal NRZ from the modulation circuit 315 in the signal processing LSI (108) and a recording clock CLK synchronized with the recording signal NRZ are output to the mark/space determination circuit 120. Upon receiving the signals NRZ and CLK, toe mark/space determination circuit 120 executes determination of the mark length and the space length, and outputs mark/space information to the recording strategy generation circuit 315. The recording strategy generation circuit 315 reads our the information on the recording strategy corresponding to the received mark/space information from the recording strategy table memory 314, and generates recording pulse information L0, L1, L2, L3, and HFon.

FIG. 25 is a timing diagram showing an operation of the optical disk recording device shown in FIG. 24. Herein, a recording signal 200 shown in FIG. 25 corresponds to the recording signal NRZ output from the modulation circuit 316, and recording marks 202 indicate recording marks formed on the optical disk 300. A recording pulse 204 shown in FIG. 25 can be decomposed into timings at which recording power levels Pf, Pl, Pm, Ps, and Pc are generated and timings at which high-frequency waveforms are superimposed. The waveforms of the recording pulse information L0, L1, L2, L3, and HFon, which are output from the recording strategy generation circuit 315 to the encode circuit 100, are respectively denoted by reference numerals 205 to 208.

Each of the recording pulse information L0, L1, L2, L3, and HFon represents a power level and a change timing of a recording pulse and is input to the encode circuit 100. When each pulse state indicated by the recording pulse information L0, L1, L2, L3, and HFon is represented by a combination of bits, 5-bit 32 states can be taken as a whole (see the encode input shown in FIG. 25). However, in the case of a castle-type shown in FIG. 25 (the recording pulse shape represented by 5T Mark), when the state of each recording pulse used to actually generate the recording pulse is represented by a combination of bits, there are six states. In addition to this, as the shape of the waveform of each recording pulse, there is a recording pattern using a multi-pulse shape. However, even when the state of each recording pulse used for optical disk recording is represented by a combination of bits, about eight states can be obtained at most.

Accordingly, in the optical disk recording device shown in FIG. 24, a 5-bit encode input represented by a combination of the recording pulse information L0, L1, L2, L3, and HFon in the encode circuit 100 is encoded into a 3-bit encode output (see the encode output shown in FIG. 25). Specifically, conversion tables corresponding to the recording pulses are stored in the conversion table memory 101, and an optimum conversion table is selected according to an instruction from the recording strategy generation circuit 315 to carry out conversion in the encode circuit 100. Assume that the conversion tables stored in the conversion table memory 101 are programmably configurable using firmware for controlling the optical disk recording device.

The 3-bit encode output obtained through the conversion is converted into an LVDS signal by the LVDS transmission circuit 102. The LVDS signal thus converted is output from the signal processing LSI (108) and input to the LVDS reception circuit 105 of the LDD (104) mounted on the optical pickup through the transmission line 103 such as a flexible cable. The LVDS signal received by the LVDS reception circuit 105 is input to the decode circuit 107. The decode circuit 107 reads a conversion table similar to the conversion table used in the signal processing LSI (108) from the conversion table memory 106 within the LDD, and restores the recording pulse information of L0, L1, L2, L3, and HFon from the received encode output.

To achieve this processing, the conversion table memory 106 within the LDD is programmably configurable from a microcomputer 317 by using firmware or the like for performing control of the optical disk recording device, as with the above-mentioned conversion table memory 101, and the same contents as the conversion table memory 101 are registered. Thus, encoding the signal transmitted between the signal processing LSI and the LDD enables transmission of the pulse timing information using three coded pulses, unlike the related art in which the pulse timing information is transmitted using five recording pulse information pieces. This makes it possible to reduce the number of signal lines in the transmission line and to reduce the number of pins of the signal processing LSI and the LDD.

Moreover, according to the technique disclosed in Japanese Unexamined Patent Application Publication No. 2009-283095, a Gray code is used for encoding. The Gray code is a code for allowing bits to change in a state transition by one bit, when each code value is assumed as a state. This state transition is shown in FIG. 26. As main recording patterns that can be taken for recording pulses, there are several types including a pulse string using a multi-pulse and a pulse string of a castle-type. These recording patterns are can be applied to the state transition using the Gray code shown in FIG. 26, because a change in power level within each pulse is formed into a pattern. The 5-bit encode input shown in the timing diagram of FIG. 25 enables transmission of the recording pulse information using the Gray code through the encoding as in the encode output shown in the timing diagram of FIG. 25, Bit 0, Bit 1, and Bit 2 respectively correspond to signal waveforms 801 to 803 of the encode output when the Gray code is used. In the Gray code, the state transition always varies only by one bit, that is, only by one signal. Accordingly, the change points, i.e., edge timings, of the encode output signals do not overlap each other. Therefore, the problem involving the management of the phase and skew between bit signals can be solved.

SUMMARY

As described in the "BACKGROUND" section, the optical disk recording device uses a recording strategy technique for optimizing recording pulses depending on recording conditions upon recording of information corresponding to a recording signal onto a recording medium by using laser light. In the case of using this recording strategy technique, it is necessary to multi-value the power level of the laser light. However, when the power level of the laser light is multi-valued, the number of signals to be transmitted to the laser diode driver (LDD) from the signal processing LSI increases, which causes a problem of an increase in the number of transmission lines (that is, the number of channels).

In the optical disk recording device disclosed in Japanese Unexamined Patent Application Publication No. 2009-283095, a 5-bit encode input is encoded into a 3-bit encode output by using the encode circuit 100 (see FIG. 24). This contributes to a reduction in the number of channels of the transmission line from five to three. However, even by the use of the technique disclosed in Japanese Unexamined Patent Application Publication No. 2009-283095, it is impossible to reduce the number of transmission lines. Specifically, For example, it is impossible to transmit 5-bit recording pulse information using a 2-channel transmission line.

A first aspect of the present invention is an optical disk recording device that records information corresponding to a recording signal onto a recording medium by using laser light, the optical disk recording device including: a recording pulse information generation unit that generates, from the recording signal, recording pulse information corresponding to a power level of the laser light; a recording code generation unit that generates a recording code by encoding the recording pulse information; a transmission line that transmits the recording code; and a decoded code generation unit that generates a decoded code by decoding the recording code transmitted. The recording code generation unit generates the recording code based on a cyclic code representing each transition of the power level by using a Gray code. The decoded code generation unit decodes the recording code using a recording code corresponding to a power level at a predetermined timing and a recording code corresponding to a power level immediately prior to the power level at the predetermined timing.

In the optical disk recording device according to one aspect of the present invention, the cyclic code represented using a Gray code is used and the decoded code including the preceding recording code representing the state of the preceding power level is generated. This contributes to a reduction in the number of bits of a signal upon transmission of the signal through the transmission line.

A second aspect of the present invention is a recording data transmission method for an optical disk recording device that records information corresponding to a recording signal onto a recording medium by using laser light, the recording data transmission method including: generating, from the recording signal, recording pulse information corresponding to a power level of the laser light; generating a recording code obtained by encoding the recording pulse information, based on a cyclic code representing each transition of the power level by using a Gray code; transmitting the recording code; and generating a decoded code by decoding the recording code transmitted, by using a recording code corresponding to a power level at a predetermined timing and a recording code corresponding to a power level immediately prior to the power level at the predetermined timing.

In the recording data transmission method according to another another aspect of the present invention, the cyclic code represented using a Gray code is used and the decoded code including the preceding recording code representing the state of the preceding power level is generated. This contributes to a reduction in the number of bits of a signal upon transmission of recording data.

A third aspect of the present invention is a semiconductor device that converts each of at least five different states into 2-bit data and outputs the 2-bit data. The 2-bit data varies by one bit upon transition of the states, and a current state can be specified based on current 2-bit data and preceding 2-bit data.

According to exemplary aspects of the present invention, it is possible to provide an optical disk recording device, a recording data transmission method, and a semiconductor device that can suppress an increase in the number of channels of a transmission line.

BRIEF DESCRIPTION OF THE DRAWINGS

The above and other aspects, advantages and features will be more apparent from the following description of certain embodiments taken in conjunction with the accompanying drawings, in which:

FIG. 5 is a table showing an example of relations among recording pulse information, power level, recording code, and cyclic code;

FIG. 6 is a table showing relations among the recording pulse information, the power level, and the recording code;

FIG. 7 is a table showing an example of relations among decoded code, power level, and power data;

FIG. 17 is a table showing an example of relations among recording pulse information, power level, output code, recording code, and cyclic code;

FIG. 18 is a table showing a relation among recording pulse information, power level, output code, and recording code;

FIG. 22 is a table showing relations among extension code, decoded code, and power level;

DETAILED DESCRIPTION

First Embodiment

Hereinafter, embodiments of the present invention will be described with reference to the accompanying drawings.

Figure 1:
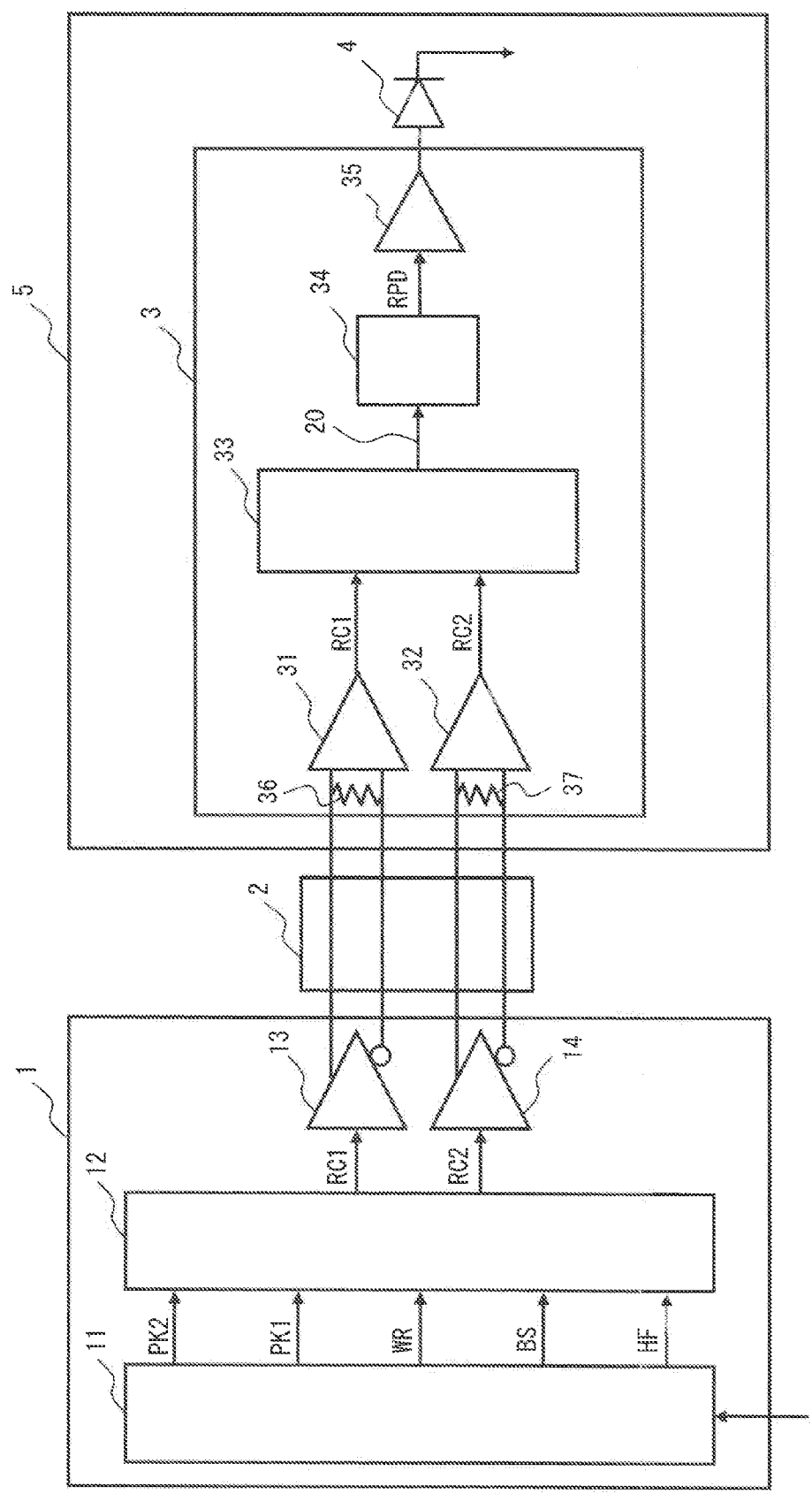
FIG. 1 is a block diagram showing an optical disk recording device according to a first embodiment.

FIG. 1 is a block diagram showing an optical disk recording device according to a first embodiment of the present invention. The optical disk recording device according the first embodiment includes a signal, processing unit 1, a transmission line 2, and an optical pickup 5. The optical pickup 5 is equipped with a laser diode driver (LDD) 3 and a laser diode 4 which is driven by the LDD 3.

The signal processing unit 1 includes a recording pulse information generation unit 11, a recording code generation unit 12, and low voltage differential signal (LVDS) transmission units 13 and 14.

Figure 3:
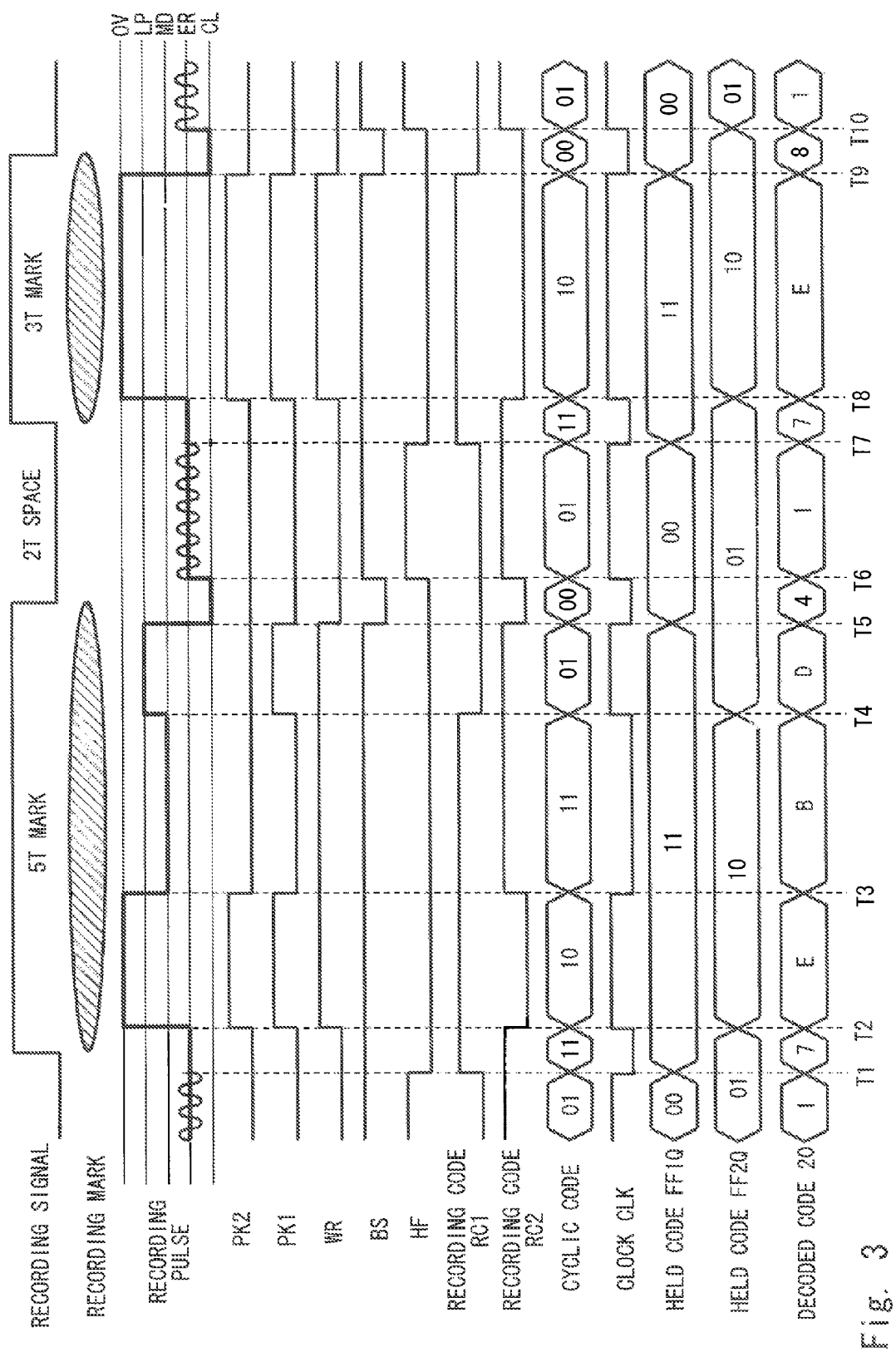
FIG. 3 is a timing diagram showing an operation of the optical disk recording device according to the first embodiment (a first example of cyclic code)

When a recording signal is supplied, the recording pulse information generation unit 11 generates recording pulse information items PK2, PK1, WR, BS, and HF respectively corresponding to power levels of laser light, and outputs the generated recording pulse information items to the recording code generation unit 12. The term "recording signal" herein described refers to a signal supplied from an upper circuit (not shown) and is used to form a recording mark on a recording medium. FIG. 3 shows the shape of each recording mark formed on the recording medium and the recording signal supplied to the recording pulse information generation unit 11 during the formation of each recording mark.

As shown in FIG. 3, the recording pulse information is a signal obtained by converting a recording pulse, which allows multi-valued power levels (OV, LP, MD, ER, CL, "high-frequency waveform superposition"; the number of power levels is six in this case) to be output, into 5-bit signals (PK2, PK1, WR, BS, HF). This recording pulse is generated using recording strategy technique. Specifically, as shown in FIG. 5, when the power level indicates "high-frequency waveform superposition", the recording pulse information (PK2, PK1, WR, BS, HF) represents (0, 0, 0, 1, 1); when the power level indicates "ER", the recording pulse information represents (0, 0, 0, 1, 0); when the power level indicates "OV", the recording pulse information represents (1, 1, 1, 1, 0); when the power level indicates "MD", the recording pulse information represents (0, 0, 1, 1, 0); when the power level indicates "LP", the recording poise information represents (0, 1, 1, 1, 0); and when the power level indicates "CL", the recording pulse information represents (0, 0, 0, 0, 0).

The recording pulse shown in FIG. 3 corresponds to the waveform of laser light output from the laser diode 4. The shape of the waveform of the recording pulse corresponding to the recording signal (5T Mark) shown in FIG. 3 is generally called a castle shape. The shape of the waveform of the recording pulse shown in the recording signal (3T Mark) is generally called a mono-pulse shape. Herein, "T" represents a minimum reference time in a CD, a DVD, and a BD; "3T Mark" represents a time three times as long as the minimum reference time; and "5T Mark" represents a time five times as long as the minimum reference time. Note that in the case of forming 5T Mark, the castle-shaped recording pattern may be used, or a mono-pulse shape and a multi-pulse shape may be used depending on the recording conditions such as the type and the recording rate of the recording medium. Also in the case of forming 3T Mark, the multi-pulse shape may be used, in addition to the mono-pulse-shaped recording pattern.

In the optical disk recording device according to the first embodiment, 5-bit information is used as an example of the recording pulse information generated by the recording pulse information generation unit 11. The number of bits of the recording pulse information is not limited thereto, but may be arbitrarily determined.

The recording code generation unit 12 generates recording codes RC1 and RC2 by encoding the recording pulse information generated by the recording pulse information generation unit 11. For example, the recording code generation unit 12 is able to encode the recording pulse information with a number of bits smaller than the square root of the number of power levels. The optical disk recording device according to the first embodiment encodes the 5-bit recording pulse information items PK2, PK1, WR, BS, and HF to thereby generate the 2-bit recording codes RC1 and RC2. In this case, a cyclic code is used in which a transition of each power level (OV, LP, MD, ER, CL, "high-frequency waveform superposition") is represented using a Gray code.

Figure 4:
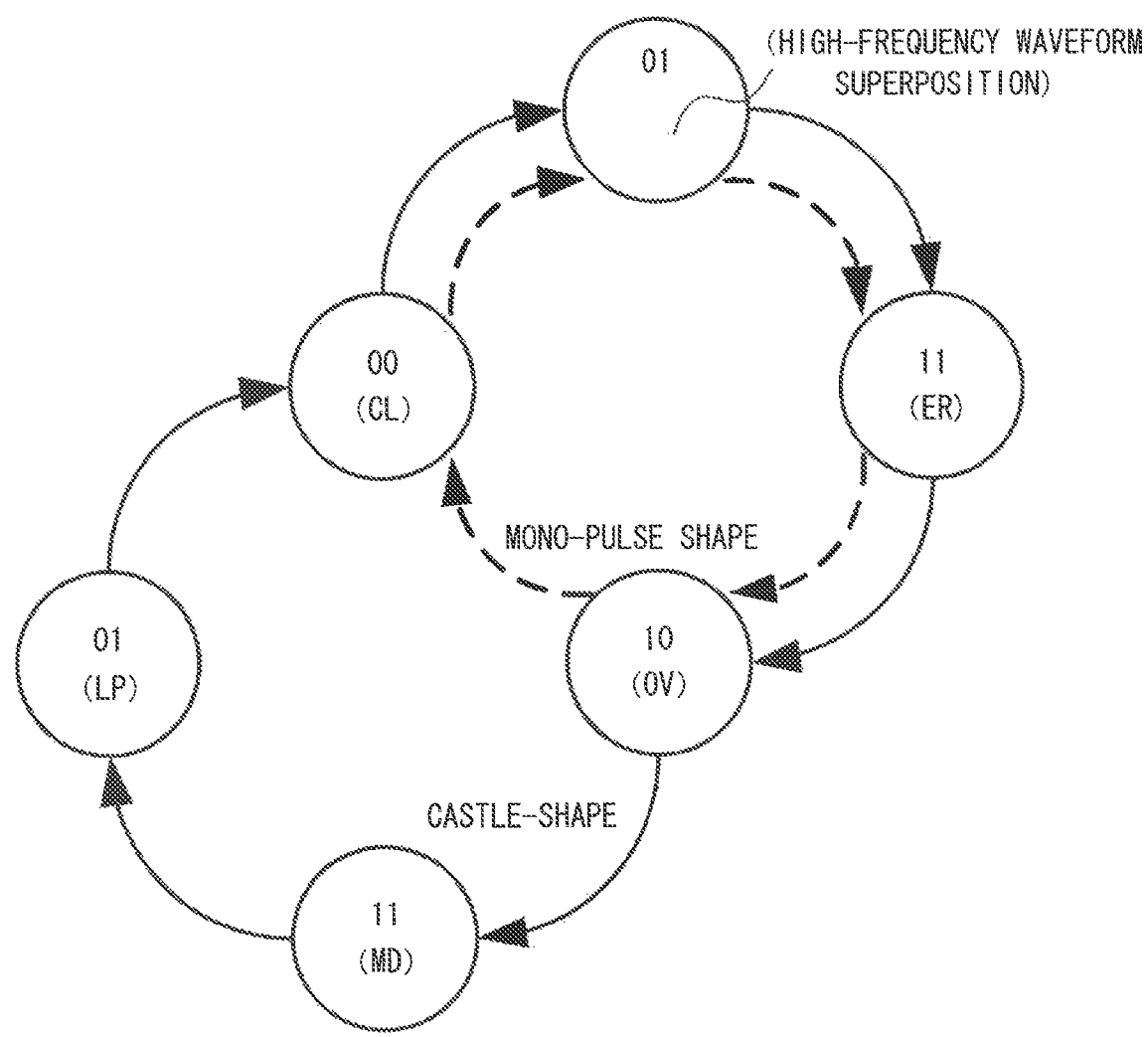
FIG. 4 is a diagram showing the first example of the cyclic code used in the optical disk recording device according to the first embodiment.

FIG. 4 is a diagram showing a first example of cyclic codes used in the optical disk recording device according to the first embodiment. Each cyclic code shown in FIG. 4 indicates each power level of the recording pulse. A Gray code where consecutive bit numbers are changed only by one bit is used when the power level of the recording pulse transits to the next power level. For example, in the transition from the state of the high-frequency waveform superposition to the state of the power level ER, the cyclic code transits from "01" to "11". In this case, the bit values are changed only by one bit.

The recording code generation unit 12 converts the recording pulse information (PK2, PK1, WR, BS, HF) into the recording codes RC1 and RC2 by using the table shown in FIG. 5, for example. Specifically, when the recording pulse information (PK2, PK1, WR, BS, HF) represents (0, 0, 0, 1, 1) (power level; "high-frequency waveform superposition"), (0, 1) is generated as the recording codes (RC1, RC2). When the recording pulse information represents (0, 0, 0, 1, 0) (ER), (1, 1) is generated as the recording codes. When the recording pulse information represents (1, 1, 1, 1, 0) (OV), (1, 0) is generated as the recording codes. When the recording pulse information represents (0, 0, 1, 1, 0) (MD), (1, 1) is generated as the recording codes. When the recording pulse information represents (0, 1, 1, 1, 0) (LP), (0, 1) is generated as the recording codes. When the recording pulse information represents (0, 0, 0, 0, 0) (CL), (0, 0) is generated as the recording codes.

Note that the table shown in FIG. 5 is illustrative only, and the table shown in FIG. 6 can be generally used. In the table shown in FIG. 6, the value "0" or "1" may be used as "A" and "B" of the recording codes (RC1, RC2). Specifically, A="0" and B="0"; A="0" and B="1"; A="1" and B="0"; or A="1" and B="1" can be used. Note that when A="0" and B="1" are used, the results are similar to those shown in the table shown in FIG. 5.

The recording codes RC1 and RC2 generated by the recording code generation unit 12 are respectively output to the LVDS transmission units 13 and 14.

Upon receiving the recording code RC1, the LVDS transmission unit 13 converts the recording code RC1 into differential signals, and outputs the differential signals to an LVDS reception unit 31 through the transmission line 2. Similarly, upon receiving the recording code RC2, the LVDS transmission unit 14 converts the recording code RC2 into differential signals, and outputs the differential signals to an LVDS reception unit 32 via the transmission line 2.

For example, a flexible cable is used as the transmission line 2. In general, the signal processing unit 1 is fixed to the main body of the optical disk recording device, while the optical pickup 5 equipped with the LDD 3 and the laser diode 4 is configured to be accessible to any location in the recording medium. For this reason, a flexible cable is used as the transmission line 2 to connect the signal processing unit 1 with the optical pickup 5 including the LDD 3.

The LDD 3 includes the LVDS reception units 31 and 32, a decoded code generation unit 33, a power level selection unit 34, a digital-to-analog conversion circuit (hereinafter referred to as "DAC") 35, and terminal resistors 36 and 37. The terminal resistors 36 and 37 are respectively provided on the input sides of the LVDS reception units 31 and 32.

Upon receiving the differential signals output from the LVDS transmission unit 13, the LVDS reception unit 31 outputs the recording code RC1, which is converted into a binary signal, to the decoded code generation unit 33. Similarly, upon receiving the differential signals output from the LVDS transmission unit 14, the LVDS reception unit 32 outputs the recording code RC2, which is converted into a binary signal, to the decoded code generation unit 33.

The decoded code generation unit 33 decodes the transmitted recording code to generate a decoded code. At this time, the decoded code generation unit 33 decodes the recording code by using a recording code corresponding to a power level at a predetermined timing and a recording code corresponding to a power level immediately prior to the power level at the predetermined timing.

Figure 2:
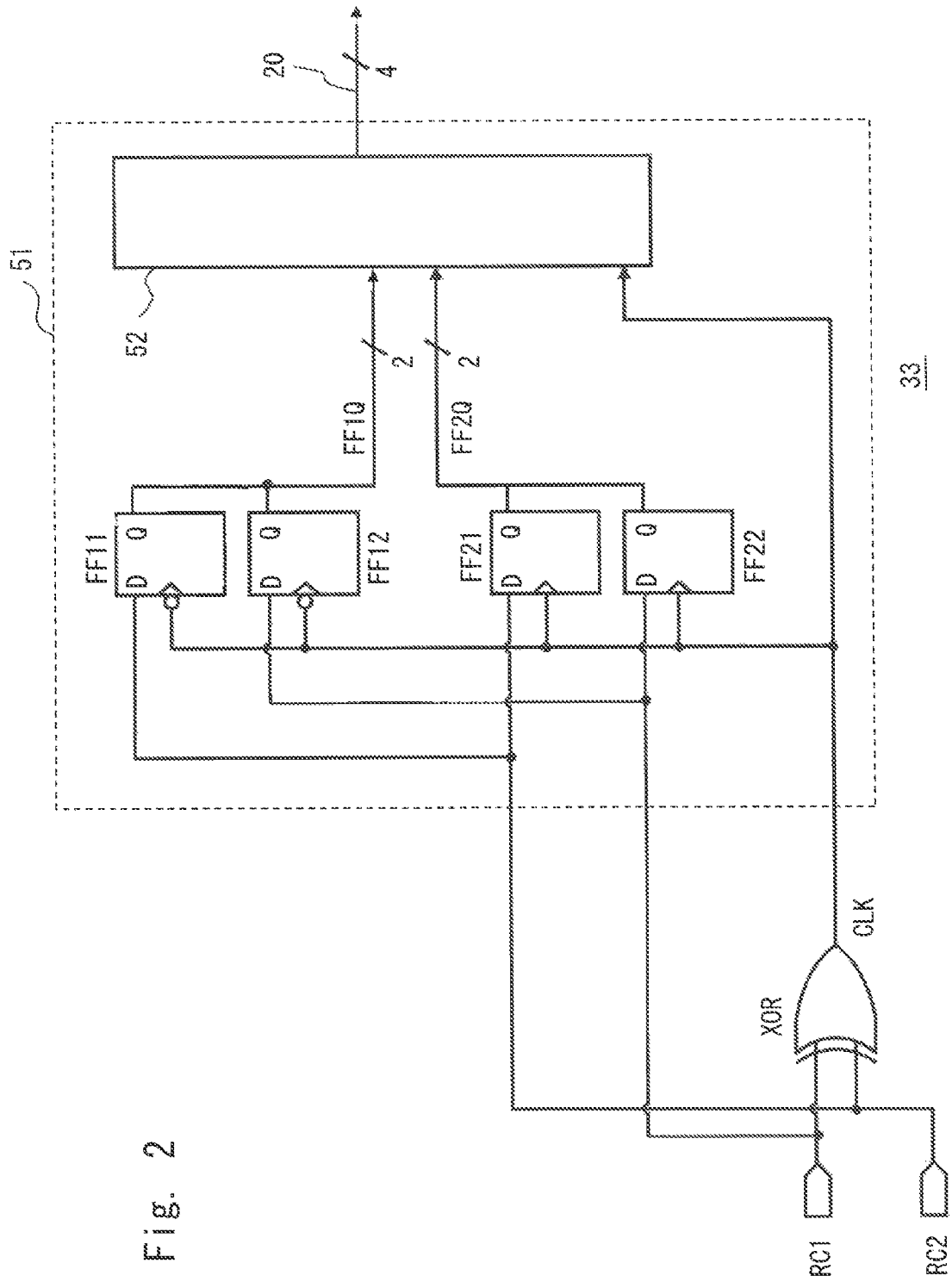
FIG. 2 is a circuit diagram showing a decoded erode generation unit included in the optical disk recording device according to the first embodiment.

FIG. 2 is a circuit diagram showing an exemplary configuration of the decoded code generation unit 33. The decoded code generation unit 33 shown in FIG. 2 includes a clock generation unit XOR and a recording code holding unit 51. The clock generation unit XOR may be composed of an exclusive OR circuit, for example. The clock generation unit XOR generates a clock CLK based on timings at which the recording codes RC1 and RC2 are received. Specifically, the clock generation unit XOR outputs "0" as the clock CLK when both the recording codes RC1 and RC2 indicate "1" or "0", and outputs "1" as the clock CLK when one of the recording codes RC1 and RC2 indicates "1" and the other indicates "0".

The recording code holding unit 51 holds each of the recording codes RC1 and RC2 received according to the clock CLK generated by the clock generation unit XOR, and outputs each of the held recording codes RC1 and RC2 as a decoded code 20. The recording code holding unit 51 may be composed of first flip-flops (FF11, FF12), second flip-flops (FF21, FF22), and a switching unit 52.

The first flap-flops (FF11, FF12) are driven by a falling edge of the clock CLK generated by the clock generation unit XOR. Further, the first flip-flops hold the respective recording codes RC1 and RC2 and output the held recording codes RC1 and RC2 to the switching unit 52. The held recording codes RC1 and RC2 are held until the subsequent falling edge of the clock CLK.

The second flip-flops (FF21, FF22) are driven by a rising edge of the clock CLK generated by the clock generation unit XOR. Further, the second flip-flops hold the respective recording codes RC1 and RC2 and output the held recording codes RC1 and RC2 to the switching unit 52. The held recording codes RC1 and RC2 are held until the subsequent rising edge of the clock CLK.

The switching unit 52 switches the sequence of a held code FF1Q, which is output from the first flip-flops (FF11, FF12), and a held code FF2Q, which is output from the second flip-flops (FF21, FF22), according to the clock CLK, and outputs the held code FF1Q and the held code FF2Q, the sequence of which has been switched, as the decoded code 20. At this time, each of the held code FF1Q and the held code FF2Q is a 2-bit data string, and the decoded code 20 is a 4-bit data string.

Specifically, when the clock CLK indicates "0", the switching unit 52 allocates the held code FF2Q to the upper two bits and allocates the held code FF1Q to the lower two bits, and then outputs them as the decoded code 20. On the other hand, when the clock CLK indicates "1", the switching unit 52 allocates the held code FF1Q to the upper two bits and allocates the held code FF2Q to the lower two bits, and then outputs them as the decoded cede 20.

The power level selection unit 34 selects a power level corresponding to the decoded code 20 generated by the decoded code generation unit 33. FIG. 7 is a table showing an example of relations among the decoded code 20, the power level, and the power data. Herein, each power data item is digital data corresponding to the power level of the laser diode.

As shown in FIG. 7, when the decoded code 20 represents (0, 0, 0, 1) ("1" in hexadecimal notation), the power level selection unit 34 outputs "LV1HF" as the power data corresponding to the power level "high-frequency waveform superposition". When the decoded code 20 represents (0, 1, 1, 1) ("7" in hexadecimal notation), the power level selection unit 34 outputs "LV1" as the power data corresponding to the power level "ER". When the decoded code 20 represents (1, 1, 1, 0) ("E" in hexadecimal notation), the power level selection unit 34 outputs "LV4" as the power data corresponding to the power level "OV". When the decoded code 20 represents (1, 0, 1, 1) ("B" in hexadecimal notation), the power level selection unit 34 outputs "LV2" as the power data corresponding to the power level "MD". When the decoded code 20 represents (1, 1, 0, 1) ("D" in hexadecimal notation), the power level selection unit 34 outputs "LV3" as the power data corresponding to the power level "LP". When the decoded code 20 represents (0, 1, 0, 0) ("4" in hexadecimal notation), the power level selection unit 34 outputs "LV0" as the power data corresponding to the power level "CL". When the decoded code 20 represents (1, 0, 0, 0) ("8" in hexadecimal notation), the power level selection unit 34 outputs "LV0" as the power data corresponding to the power level "CL". Power data RPD selected by the power level selection unit 34 is output to the DAC 35.

Note that in the optical disk recording device according to the first embodiment, as shown in FIG. 7, codes where the former cyclic code (upper two bits) and the latter cyclic code (lower two bits) differ only by one bit are used as the 4-bit decoded code 20. For example, in the decoded code (0, 0, 0, 1) shown in FIG. 7, the upper two bits (0, 0) and the lower two bits (0, 1) differ only by one bit. Similarly, in the decoded code (0, 1, 1, 1), the upper two bits (0, 1) and the lower two bits (1, 1) differ only by one bit. On the other hand, in a code (0, 0, 1, 1), for example, the upper two bits (0, 0) and the lower two bits (1, 1) differ by two bits. Accordingly, this code is not used as the decoded code. Further, in a code (0, 1, 0, 1), for example, there is no difference between the upper two bits (0, 1) and the lower two bits (0, 1). Accordingly, this code is not used as the decoded code.

The DAC 35 converts the power data RPD (digital data) selected by the power level selection unit 34 into a laser drive current, and supplies the drive current to the laser diode 4. The laser diode 4 irradiates the recording medium with laser light of the power level corresponding to the drive current output from the DAC 35, thereby forming a recording mark on the recording film of the recording medium.

Next, the operation of the optical disk recording device according to the first embodiment will be described with reference to the timing diagram shown in FIG. 3. In the timing diagram shown in FIG. 3, the castle-shaped recording pulse is used during formation of the recording mark corresponding to the recording signal (5T Mark), and the mono-pulse-shaped recording pulse is used during formation of the recording mark corresponding to the recording signal (3T Mark).

Now, description is given of the operation when the recording mark corresponding to the recording signal (5T Mark) is formed using the castle-shaped recording pulse. In the case of the castle-shaped recording pulse, the cyclic code and the power level transit in the order of "high-frequency waveform superposition" (01)→ER (11)→OV (10)→MD (11)→LP (01)→CL (00)→"high-frequency waveform superposition" (01), as shown in the cyclic code of FIG. 4.

At T1, the power level of the recording pulse is "ER", Accordingly, the recording pulse information generation unit 11 shown in FIG. 1 outputs the recording pulse information (PK2, PK1, WR, BS, HF) representing (0, 0, 0, 1, 0) to the recording code generation unit 12. The recording code generation unit 12 converts the recording pulse information using the table shown in FIG. 5, and outputs (1, 1) as the recording codes RC1 and RC2. At this time, the cyclic code is "11". The recording codes RC1 and RC2 are supplied to the decoded code generation unit 33 via the LVDS transmission units 13 and 14, the transmission line 2, and the LVDS reception units 31 and 32.

The clock generation unit XOR of the decoded code generation unit 33 shown in FIG. 2 outputs clock CLK="0" (falling), because RC1="1" and RC2="1". The first flip-flops (FF11, FF12) hold the recording codes RC1="1" and RC2="1" as the held code FF1Q="11" at the timing of a falling edge of the clock CLK, and outputs the held code FF1Q="11" to the switching unit 52.

Since the clock CLK="0" (failing), the switching unit 52 allocates the held code FF2Q="11" to the upper two bits and allocates the held code FF1Q="11" to the lower two bits, and then outputs (0, 1, 1, 1) ("7" in hexadecimal notation) as the decoded code 20. Herein, the held code FF2Q="01" is the held code FF2Q loaded into the second flip-flops (FF21, FF22) at the timing immediately before T1, and is the held code corresponding to the recording codes RC1="0" and RC2="1".

The power level selection unit 34 outputs the power data "LV1" corresponding to the decoded code 20 output from the decoded code generation unit 33. The DAC 35 converts the power data "LV1" selected by the power level selection unit 34 into a laser drive current, and supplies the drive current to the laser diode 4. The laser diode 4 irradiates the recording medium with laser light of the power level corresponding to the drive current output from the DAC 35.

At T2, the power level of the. recording pulse is "OV". Accordingly, the recording pulse information generation unit 11 shown in FIG. 1 outputs the recording pulse information (PK2, PK1, WR, BS, HF) representing (1, 1, 1, 1, 0) to the recording code generation unit 12. The recording code generation unit 12 converts the recording pulse information by using the table shown in FIG. 5, and outputs (1, 0) as the recording codes RC1 and RC2. At this time, the cyclic code is "10". The recording codes RC1 and RC2 are supplied to the decoded code generation unit 33 via the LVDS transmission units 13 and 14, the transmission line 2, and the LVDS reception units 31 and 32.

Since RC1="1" and RC2="0", the clock generation unit XOR of the decoded code generation unit 33 shown in FIG. 2 outputs the clock CLK="1" (rising). The second flip-flops (FF21, FF22) hold the recording codes RC1="1" and RC2="0" as the held code FF2Q="10" at the timing of a rising edge of the clock CLK, and outputs the held code FF2Q="10" to the switching unit 52.

Since the clock CLK="1" (rising), the switching unit 52 allocates the held: code FF1Q="1" to the upper two bits and allocates the held code FF2Q="10" to the lower two bits, and then outputs (1, 1, 1, 0) ("E" in hexadecimal notation) as the decoded code 20. Herein, the held code FF1Q="11" is the held code FF1Q loaded into the first flip-flops (FF11, FF12) at the timing T1, and is the held code corresponding to the recording codes RC1="1" and RC2="1".

The power level selection unit 34 outputs the power data "LV4" corresponding to the decoded code 20 output from the decoded code generation unit 33. The DAC 35 converts the power data "LV4" selected by the power level selection unit 34 into a laser drive current, and supplies the drive current to the laser diode 4. The laser diode irradiates the recording medium with laser light of the power level corresponding to the drive current output from the DAC 35.

At T3, the power level of the recording pulse is "MD". Accordingly, the recording pulse information generation unit 11 shown in FIG. 1 outputs the recording pulse information (PK2, PK1, WR, BS, HF) representing (0, 0, 1, 1, 0) to the recording code generation unit 12. The recording code generation unit 12 converts the recording pulse information by using the table shown in FIG. 5, and outputs (1, 1) as the recording codes RC1 and RC2. At this time, the cyclic code is "11". The recording codes RC1 and RC2 are supplied to the decoded code generation unit 33 via the LVDS transmission units 13 and 14, the transmission line 2, and the LVDS reception units 31 and 32.

Since RC1="1" and RC2="1", the clock generation unit XOR of the decoded code generation unit 33 shown in FIG. 2 outputs the clock CLK="0" (falling). At the timing of a falling edge of the clock CLK, the first flip-flops (FF11, FF12) hold the recording codes RC1="1" and RC2="1" as the held code FF1Q="11", and output the held code FF1Q="11" to the switching unit 52.

Since the clock CLK="0" (falling), the switching unit 52 allocates the held code FF2Q="10" to the upper two bits and allocates the held code FF1Q="11" to the lower two bits, and then outputs (1, 0, 1, 1) ("B" in hexadecimal notation) as the decoded code 20. Herein, the held code FF2Q="10" is the held code FF2Q loaded into the second flip-flops (FF21, FF22) at the timing of T2, and is the held code corresponding to the recording codes RC1="1" and RC2="0".

The power level selection unit 34 outputs the power data "LV2" corresponding to the decoded code 20 output from the decoded code generation unit 33. The DAC 35 converts the power data "LV2" selected by the power level selection unit 34 into a laser drive current, and supplies the drive current to the laser diode 4. The laser diode 4 irradiates the recording medium with laser light of the power level corresponding to the drive current output from the DAC 35.

At T4, the power level of the recording pulse is "LP". Accordingly, the recording pulse Information generation unit 11 shown in FIG. 1 outputs the recording pulse information (PK2, PK1, WR, BS, HF) representing (0, 1, 1, 1, 0) to the recording code generation unit 12. The recording code generation unit 12 converts the recording pulse information by using the table shown in FIG. 5, and outputs (0, 1) as the recording codes RC1 and RC2. At this time, the cyclic code is "01". The recording codes RC1 and RC2 are supplied to the decoded code generation unit 33 via the LVDS transmission units 13 and 14, the transmission line 2, and the LVDS reception units 31 and 32.

Since RC1="0" and RC2="1", the clock generation unit XOR of the decoded code generation unit 33 shown in FIG. 2 outputs the clock CLK="1" (rising). At the timing of a rising edge of the clock CLK, the second flip-flops (FF21, FF22) hold the recording codes RC1="0" and RC2="1" as the held code FF2Q="01" and hold the recording codes RC1="0" and RC2="1" as the held code FF2Q="01", and output the held code FF2Q="01" to the switching unit 52.

Since the clock CLK="1" (rising), the switching unit 52 allocates the held code FF1Q="11" to the upper two bits and allocates the held code FF2Q="01" to the lower two bits, and then outputs (1, 1, 0, 1) ("D" in hexadecimal notation) as the decoded code 20.

The power level selection unit 34 outputs the power data "LV3" corresponding to the decoded code 20 output from the decoded code generation unit 33. The DAC 35 converts the power data "LV3" selected by the power level selection unit 34 into a laser drive current, and supplies the drive current to the laser diode 4. The laser diode 4 irradiates the recording medium with laser light of the power level corresponding to the drive current output from the DAC 35.

At T5, the power level of the recording pulse is "CL". Accordingly, the recording pulse information generation unit 11 shown in FIG. 1 outputs the recording pulse information (PK2, PK1, WR, BS, HF) representing (0, 0, 0, 0, 0) to the recording code generation unit 12. The recording code generation unit 12 converts the recording pulse information by using the table shown in FIG. 5, (0, 0), and outputs the converted recording pulse information as the recording codes RC1 and RC2. At this time, the cyclic code is "00". The recording codes RC1 and RC2 are supplied to the decoded code generation unit 33 via the LVDS transmission units 13 and 14, the transmission line 2, and the LVDS reception units 31 and 32.

Since RC1="0" and RC2="0", the clock generation unit XOR of the decoded code generation unit 33 shown in FIG. 2 outputs the clock CLK="0" (falling). The first flip-flops (FF11, FF12) hold the recording codes RC1="0" and RC2="0" as the held code FF1Q="00" at the timing of a falling edge of the clock CLK, and output the held code FF1Q="00" to the switching unit 52.

Since the clock CLK="0" (falling), the switching unit 52 allocates the held code FF2Q="01" to upper two bits and allocates the held code FF1Q="00" to the lower two bits, and then outputs (0, 1, 0, 0) ("4" in hexadecimal notation) as the decoded code 20.

The power level selection unit 34 outputs the power data "LV0" corresponding to the decoded code 20 output from the decoded code generation unit 33. The DAC 35 converts the power data "LV0" selected by the power level selection unit 34 into a laser drive current, and supplies the drive current to the laser diode 4. The laser diode 4 irradiates the recording medium with laser light of the power level corresponding to the drive current output from the DAC 35.

At T6, the power level of the recording pulse is "high-frequency waveform superposition". Accordingly, the recording pulse information generation unit 11 shown in FIG. 1 outputs the recording pulse information (PK2, PK1, WR, BS, HF) representing (0, 0, 0, 1, 1) to the recording code generation unit 12. The recording code generation unit 12 converts the recording pulse information by using the table shown in FIG. 5, and outputs (0, 1) as the recording codes RC1 and RC2. At this time, the cyclic code is "01". The recording codes RC1 and RC2 are supplied to the decoded code generation unit 33 via the LVDS transmission units 13 and 14, the transmission line 2, and the LVDS reception units 31 and 32.

Since RC1="0" and RC2="1", the clock generation unit XOR of the decoded code generation unit 33 shown in FIG. 2 outputs the clock CLK="1" (rising). At the timing of a rising edge of the clock CLK, the second flip-flops (FF21, FF22) hold the recording codes RC1="0" and RC2="1" as the held code FF2Q="01", and output the held code FF2Q="01" to the switching unit 52.

Since the clock CLK="1" (rising), the switching unit 52 allocates the held code FF1Q="00" to the upper two bits and allocates the held code FF2Q="01" to the lower two bits, and then outputs (0, 0, 0, 1) ("1" in hexadecimal notation) as the decoded code 20.

The power level selection unit 34 outputs the power data "LV1HF" corresponding to the decoded code 20 output from the decoded code generation unit 33. The DAC 35 converts the power data "LV1HF" selected by the power level selection unit 34 info a laser drive current, and supplies the drive current to the laser diode 4. The laser diode 4 irradiates the recording medium with laser light of the power level corresponding to the drive current output from the DAC 35.

In the optical disk recording device according to the first embodiment, the recording mark corresponding to the recording signal (5T Mark) can be formed using the castle-shaped recording pulse by the operation described above.

Further, in the case of the mono-pulse-shaped recording pulse corresponding to the recording signal (3T Mark) (corresponding to T7 to T10 of FIG. 3), the cyclic code and the power level transit in the order of "high-frequency waveform superposition" (01)→ER (11)→OV (10)→CL (00)→"high-frequency waveform superposition" (01), as shown in the cyclic code of FIG. 4. Note that the operation of this case is also similar to that of the castle-shaped recording pulse corresponding to the recording signal (5T Mark) described above, so a redundant explanation is omitted.

In the castle-shaped recording pulse described above, for example, the recording code at T1 and the recording code at T3 are the same, that is, RC1="1" and RC2="1". However, the decoded code generation unit 33 included in the optical disk recording device according to the first embodiment decodes the recording code by using a recording code corresponding to a power level at a predetermined timing and a recording code corresponding a power level preceding the power level at the predetermined timing.

Specifically, at T1, the switching unit 52 allocates the held code FF2Q="01" to the upper two bits and allocates the held code FF1Q="11" to the lower two bits, and then outputs (0, 1, 1, 1) ("7" in hexadecimal notation) to the decoded code. 20. Herein, the held cede FF2Q="1" is the held code FF2Q loaded into the second flip-flops (FF21, FF22) at the timing immediately before T1, and is the held code corresponding to the recording codes RC1="0" and RC2="1".

Further, At T3, the switching unit 52 allocates the held code FF2Q="10" to the upper two bits and allocates the held code FF1Q="11" to the lower two bits, and then outputs (1, 0, 1, 1) ("B" in hexadecimal notation) as the decoded code 20. Herein, the held code FF2Q="10" is the held code FF20 laded into the second flip-flops (FF21, FF22) at the timing of T2, and is the held code corresponding to the recording codes RC1="1" and RC2="0".

Thus, in the optical disk recording device according to the first embodiment, the decoded code 20 is generated using the previous recording code (held code) as the upper two bits, to thereby make the decoded code (0, 1, 1, 1) at T1 different from the decoded code (1, 0, 1, 1) at T3.

As described in the "BACKGROUND" section, in the optical disk recording device, the recording strategy technique for optimizing a recording pulse depending on recording conditions upon recording information corresponding to a recording signal onto a recording medium by using laser light. In the case of using the recording strategy technique, the power level of the laser light needs to be multi-valued. However, when the power level of the laser light is multi-valued, the number of signals transmitted from the signal processing LSI (signal processing unit) to the laser diode driver (LDD) increases, which causes a problem of an increase in the number of transmission lines (i.e., the number of channels). The increase in the number of transmission lines leads to a problem of difficulty in downsizing of the optical disk recording device.

Figure 24:
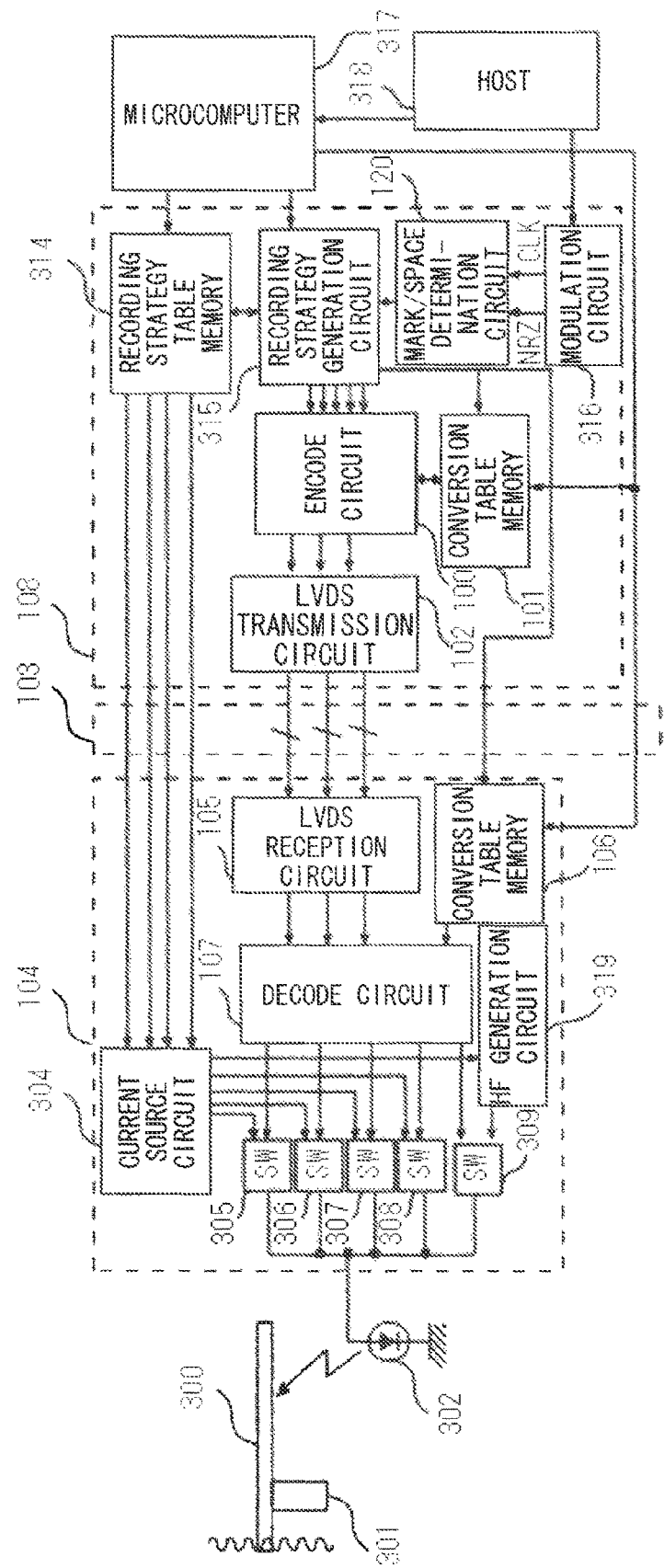
FIG. 24 is a diagram illustrating a technique disclosed in Japanese Unexamined Patent Application Publication No. 2009-283095.
Figure 25:
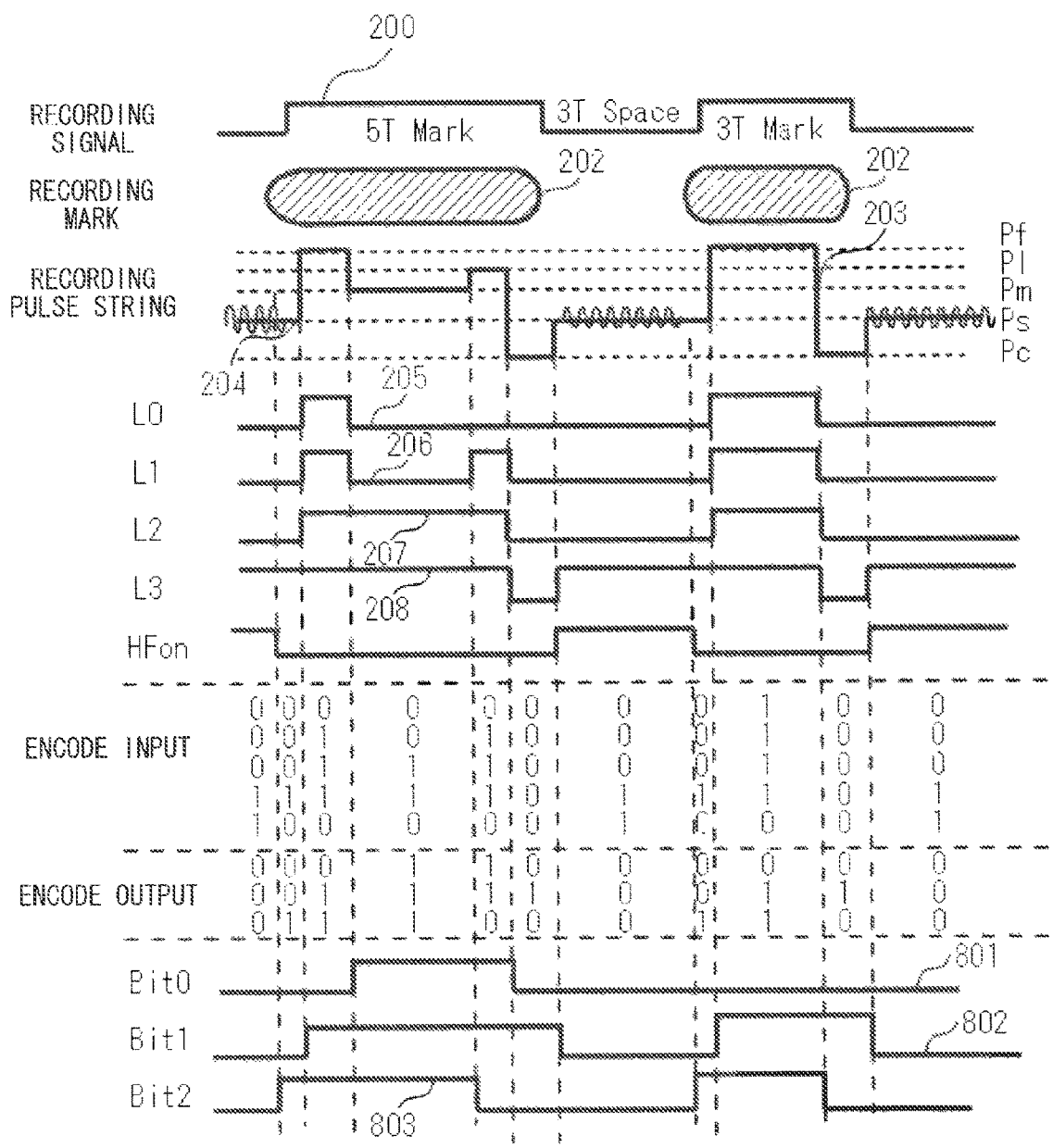
FIG. 25 is a diagram illustrating the technique disclosed in Japanese Unexamined Patent Application Publication No. 2009-283095.
Figure 26:
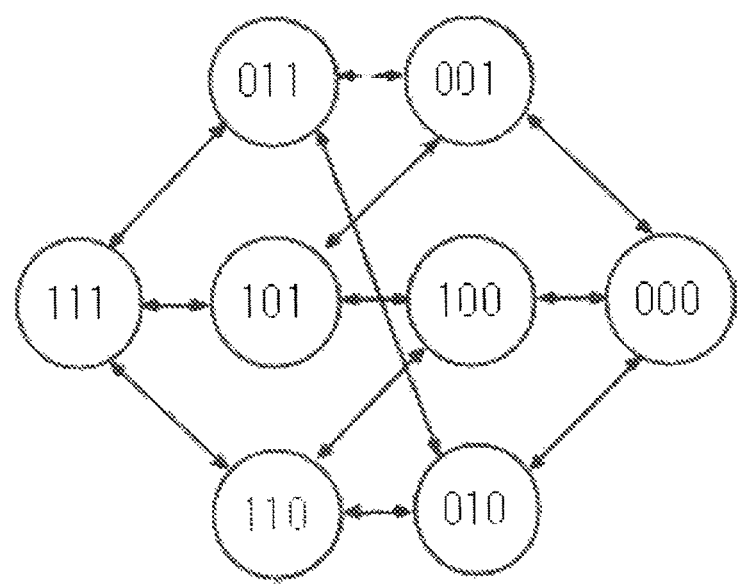
FIG. 26 is a diagram illustrating the technique disclosed in Japanese Unexamined Patent Application Publication No. 2009-283095.

To carry out high-quality recording with a small error rate, at least five values are required as the power level. However, when two channels are used as transmission lines, for example, 2-bit data, that is, only four values of power levels ($4=2^2$) can be transmitted. The optical disk recording device disclosed in Japanese Unexamined Patent Application Publication No. 2009-283095 encodes a 5-bit encode input into a 3-bit encode output by using the encode circuit 100 (see FIG. 24). This contributes to a reduction in the number of channels of the transmission line from the five channels to three channels. However, the number of transmission lines cannot be reduced even by using the technique disclosed in Japanese Unexamined Patent Application Publication No. 2009-283095. Specifically, for example, 5-bit recording pulse information cannot be transmitted using a transmission line of two channels. The reason for this will be described in detail below.

To transmit information on the power level, a binary signal represented by 0 (L) and 1 (H) is used. At this time, when one channel is used, two states of "0" and "1" can be represented by binary data; when two channels are used, four states of "00", "01", "10", and "11" can be represented by binary data; and when three channels are used, eight states of "000", "001", "010", "011", "100", "101", "110", and "111" can be represented by binary data. When these are represented arithmetically, one channel (bit) which indicates "$2^1$" enables representation of two states; two channels (bits) which indicate "$2^2$" enables representation of four states; and three channels (bits) which indicate "$2^3$" enables representation of eight states (because a binary signal is used, "2" is a base and the number of bits is represented by an exponential). Accordingly, in the technique disclosed in Japanese Unexamined Patent Application Publication No. 2009-283095, three channels are required to transmit 5-bit recording pulse information, for example, and thus, the information cannot be transmitted using a transmission line of two channels.

On the other hand, in the optical disk recording device according to the first embodiment, the decoded code 20 is generated using the cyclic code shown in FIG. 4, as well as the previous recording code showing the state of the preceding power level. This contributes to a reduction in the number of bits of a signal upon transmission of the signal through the transmission line 2.

That is, in the optical disk recording device according to the first embodiment, the recording code generation unit 12 generates the recording codes RC1 and RC2 encoded with the number of bits smaller than the square root of the number of power levels. Herein, the recording codes are generated with the cyclic code where the power levels are cyclically changed according to a Gray code. Further, the decoded code generation unit 33 holds the cyclic code each time the transmitted recording code (cyclic code) is changed, and generates the decoded code by using the recording code currently transmitted and the recording code previously transmitted. Accordingly, the number of bits of a signal upon transmission of the signal through the transmission line 2 can be reduced. This contributes to a reduction in the width of the flexible cable used as the transmission line 2 and downsizing of the optical disk recording device. The use of the optical disk recording device according to the first embodiment enables transmission of data representing five or more values of power levels by using a 2-channel transmission line.

Specifically, for example, three bits of natural numbers greater than "2.236" are conventionally necessary to represent the lumber of power levels of five states, because the square root of "5" is 2.236 . . . . On the other hand, the optical disk recording device according to the first embodiment is able to encode data with two bits, which is smaller than the square root of "5", to represent the number of power levels of five states.

Further, the optical disk recording device according to the first embodiment enables reduction in the number of terminals of each of the signal processing unit 1 and the LDD 3. This results in a reduction in the layout space for each of the signal processing unit 1 and the LDD 3 and a reduction in the area of the drive circuit board of the optical disk recording device.

Furthermore, the optical disk recording device according to the first embodiment enables reduction in the number of channels of the transmission lines 2 for transmitting the recording codes, resulting in a reduction in power consumption of the optical disk recording device. Specifically, in general, the LVDS transmission unit constantly uses a current of about 3.5 mA per channel, but the power consumption of the optical disk recording device can be reduced by reducing the number of channels of the LVDS transmission unit.

Moreover, the optical disk recording device according to the first embodiment enables reduction in the number of channels of the transmission line 2 for transmitting the recording codes, thereby suppressing the shift of the pulse timing of each recording code that occurs in each transmission line. Consequently, high-quality recording with a low error rate can be achieved.

Note that Gray code is also used in the technique disclosed in Japanese Unexamined Patent Application Publication No. 2009-283095. However, the previously transmitted signal is not used during decoding of the transmitted signal in the technique disclosed in Japanese Unexamined Patent Application Publication No. 2009-283095. Accordingly, the number of channels of the transmission line cannot be reduced even by using the technique disclosed in Japanese Unexamined Patent Application Publication No. 2009-263095, unlike the optical disk recording device according to this embodiment.

Figure 8:
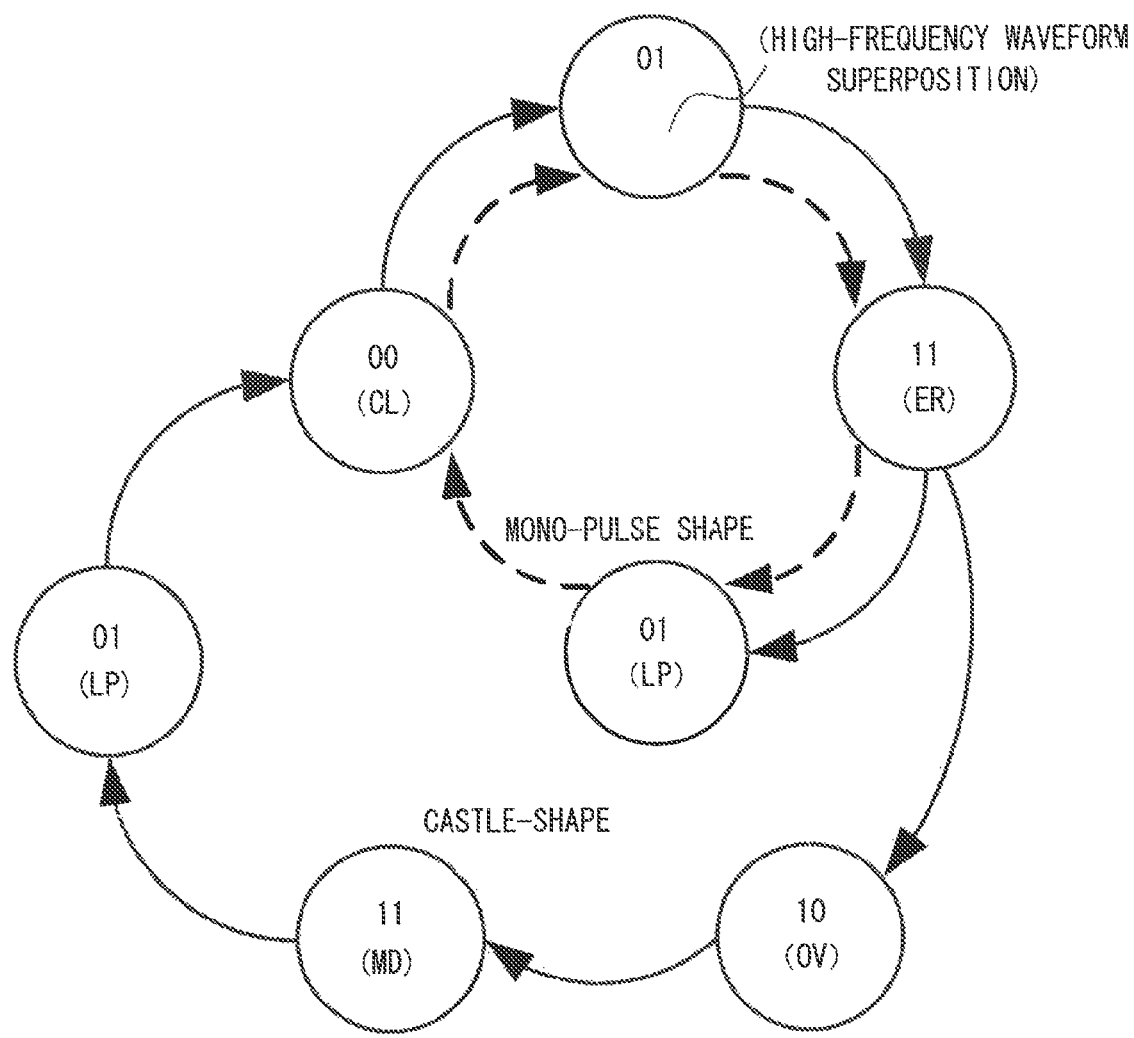
FIG. 8 is a diagram showing a second example of the cyclic code used in the optical disk recording device according to the first embodiment.
Figure 9:
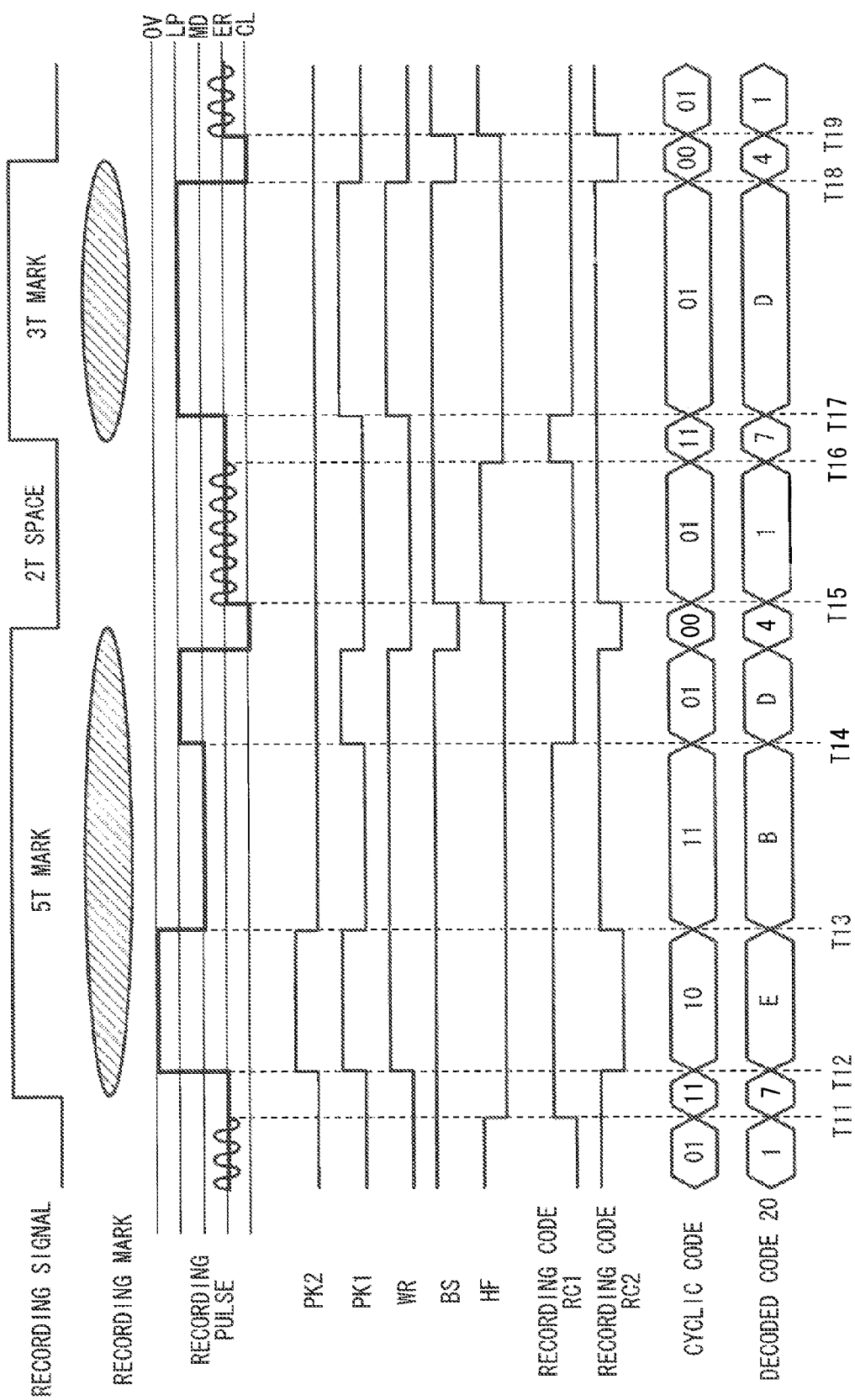
FIG. 9 is a timing diagram showing an operation of the optical disk recording device according to the first embodiment (a second example of cyclic code)

Next, another aspect of the optical disk recording device according to the first embodiment will be described. FIG. 8 is a diagram showing a second example of the cyclic code used in the optical disk recording device according to the first embodiment. FIG. 9 is a timing diagram showing the operation of the optical disk recording device in the second example of the cyclic code shown in FIG. 8. The second example of the cyclic code shown in FIG. 8 is different from the first example of the cyclic code shown in FIG. 4 in that the mono-pulse-shaped recording pulse corresponding to the recording signal (3T Mark) transits in the order of "high-frequency waveform superposition" (01)→ER (11)→LP (01) →CL (00)→"high-frequency waveform superposition" (01). That is, in the second example of the cyclic code shown in FIG. 8, OV (10) in the first example of the cyclic code shown in FIG. 4 is changed to LF (01).

The timing diagram shown in FIG. 9 is different from the timing diagram shown in FIG. 3 in the first example of the cyclic code in that the power level of the recording pulse during the period between T17 and T18 is LP. Note that the operation of the optical disk recording device in the second example of the cyclic code shown in FIG. 8 is basically the same as the operation of the optical disk recording device described in the first example of the cyclic code, so a redundant explanation is omitted.

Figure 10:
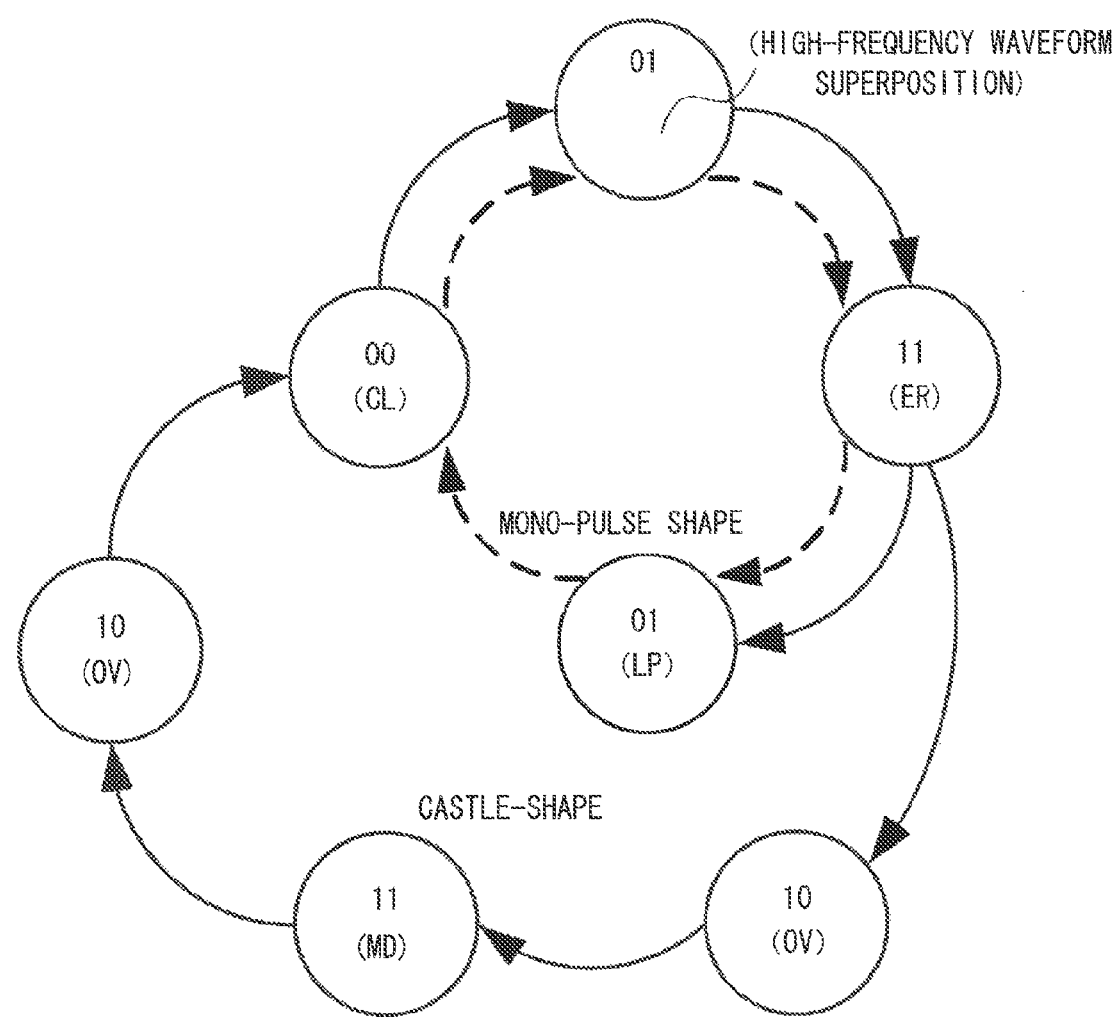
FIG. 10 is a diagram showing a third example of the cyclic code used in the optical disk recording device according to the first embodiment.
Figure 11:
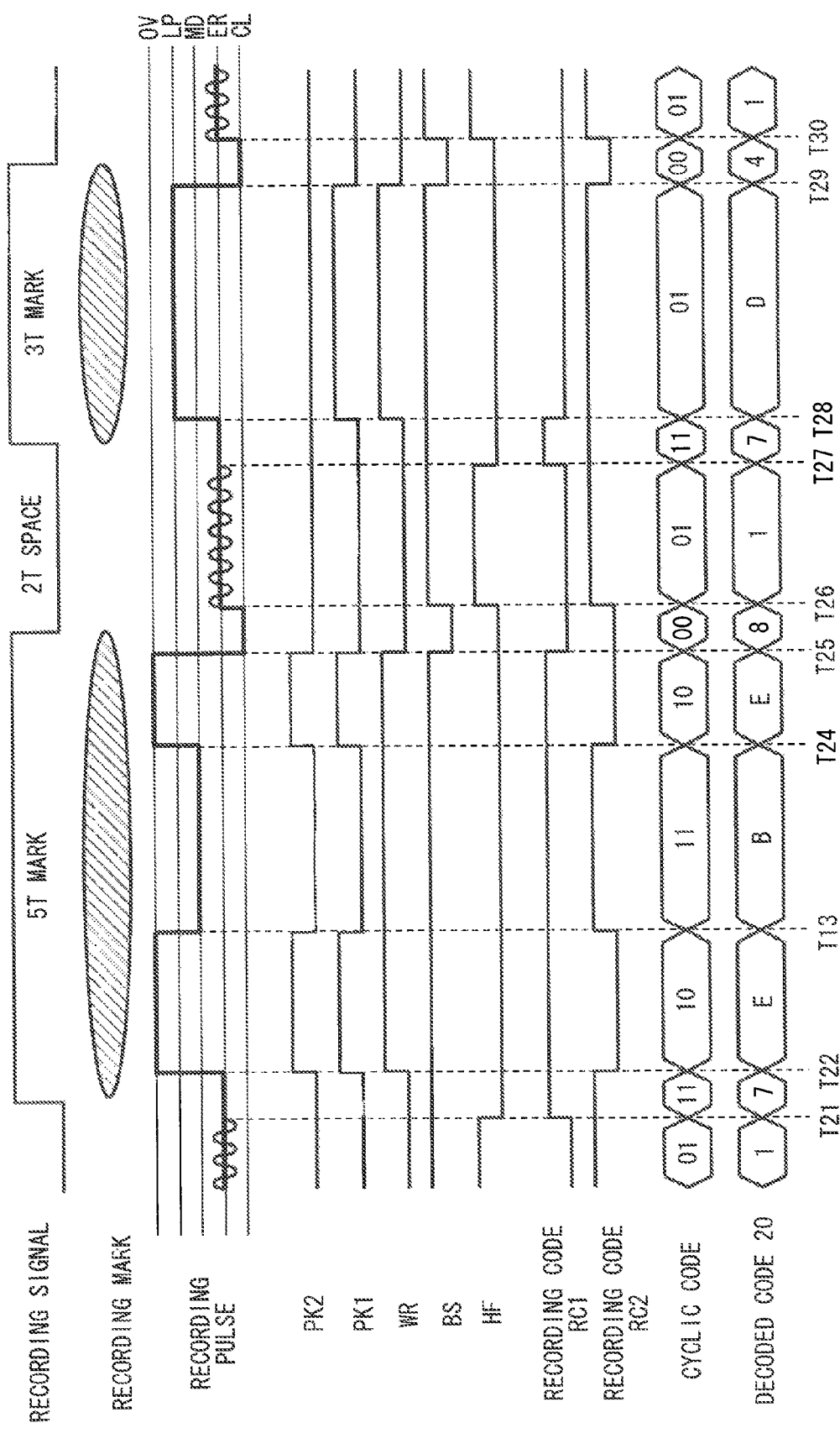
FIG. 11 is a timing diagram showing an operation of the optical disk recording device according to the first embodiment (a third example of cyclic code)

FIG. 10 is a diagram showing a third example of the cyclic code used in the optical disk recording device according to the first embodiment. FIG. 11 is a timing diagram showing the operation of the optical disk recording device in the third example of the cyclic code shown in FIG. 10. The third example of the cyclic code shown in FIG. 10 is different from the first example of the cyclic code in that the castle-shaped recording pulse corresponding to the recording signal (5T Mark) transits in the order of "high-frequency waveform superposition" (01)→ER (11)→OV (10)→MD (11)→OV (10)→CL (00)→"high-frequency waveform superposition" (01). That is, in the third example of the cyclic code shown in FIG. 10, LP (01) which is subsequent to MD (11) in the first example of the cyclic code shown in FIG. 4 is changed to OV (10).

The third example of the cyclic code shown in FIG. 10 is different from the first example of the cyclic code shown in FIG. 4 in that the mono-pulse-shaped recording pulse corresponding to the recording signal (3T Mark) transits in the order of "high-frequency waveform superposition" (01)→ER (11)→LP (01)→CL (00)→"high-frequency waveform superposition" (01). That is, OV (10) in the first example of the cyclic code shown in FIG. 4 is changed to LP (01) in the third example of the cyclic code shown in FIG. 8.

The timing diagram shown in FIG. 11 is different from the timing diagram in the first example of the cyclic code shown in FIG. 3 in that the power level of the recording pulse during the period between T24 and T25 is OV and the power level of the recording pulse during the period between T28 and T29 is LP. Note that the operation of the optical disk recording device in the third example of the cyclic code shown in FIG. 10 is basically the same as the operation of the optical disk recording device described in the first example of the cyclic code, so a redundant explanation is omitted.

Figure 12:
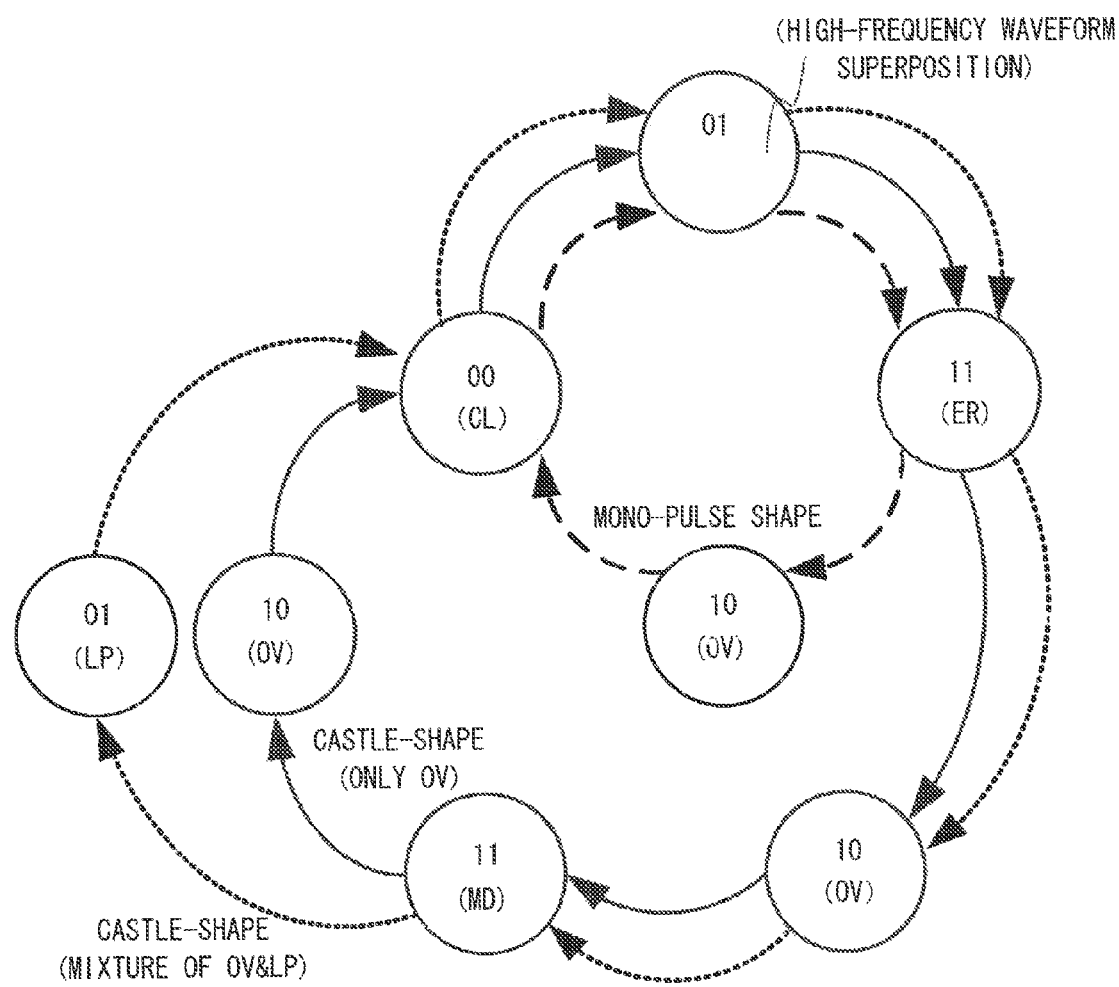
FIG. 12 is a diagram showing a fourth example of the cyclic code used in the optical disk recording device according to the first embodiment.
Figure 13:
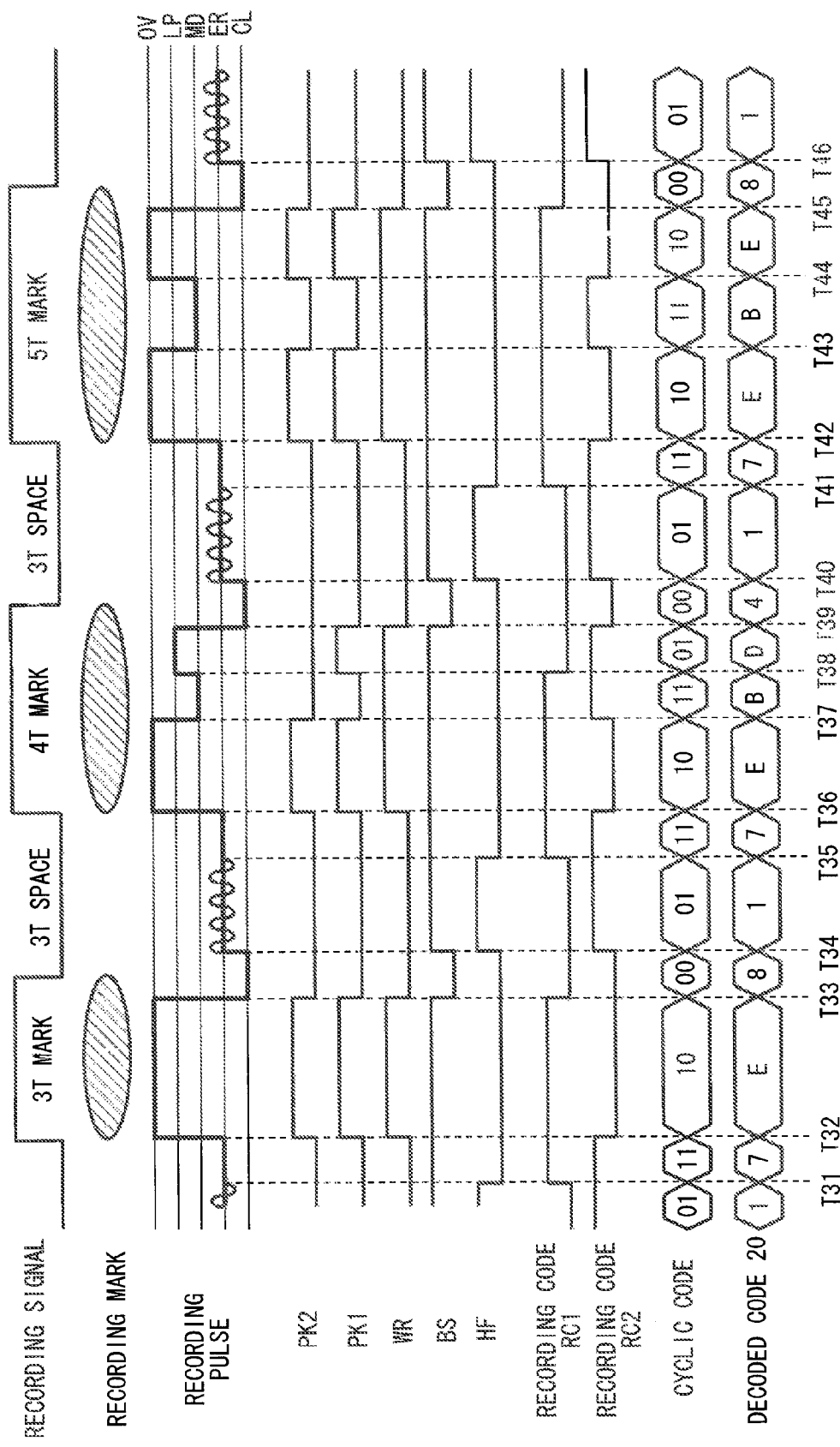
FIG. 13 is a timing diagram showing an operation of the optical disk recording device according to the first embodiment (a fourth example of cyclic code)

FIG. 12 is a diagram showing a fourth example of the cyclic code used in the optical disk recording device according to the first embodiment. FIG. 13 is a timing diagram showing the operation of the optical disk recording device in the fourth example of the cyclic code shown in FIG. 12. The fourth example of the cyclic code shown in FIG. 12 is different from the first example of the cyclic code shown in FIG. 4 in that the castle-shaped recording pulse corresponding to the recording signal (4T Mark) is generated. Herein, the castle-shaped recording pulse corresponding to the recording signal (4T Mark) transits in the order of "high-frequency waveform superposition" (01)→LP, (11)→OV (10)→MD (11)→LP (01)→CL (00)→"high-frequency waveform superposition" (01).

The fourth example of the cyclic code shown in FIG. 12 is different from the first example of the cyclic code shown in FIG. 4 in that the castle-shaped recording pulse corresponding to the recording signal (5T Mark) transits in the order of "high-frequency waveform superposition" (01)→ER (11)→OV (10)→MD (11)→OV (10)→CL (00)→"high-frequency waveform superposition" (01). That is, in the fourth example of the cyclic code shown in FIG. 12, LP (01) which is subsequent to MD (11) in the first example of the cyclic code shown in FIG. 4 is changed to the OV (10).

The timing diagram shown in FIG. 13 is different from the timing diagram in the first example of the cyclic code shown in FIG. 3 in that the castle-shaped recording pulse corresponding to the recording signal (4T Mark) is generated during the period between T35 and T40 and the power level of the recording pulse is OV during the period between T44 and T55 of the castle-shaped recording pulse corresponding to the recording signal (5T Mark). Note that the operation of the optical disk recording device in the fourth example of the cyclic code shown in FIG. 12 is basically the same as the operation of the optical disk recording device described in the first example of the cyclic code, so a redundant explanation is omitted.

As described above, according to the first embodiment of the present invention, it is possible to provide an optical disk recording device and a recording data transmission method which are capable of suppressing an increase in the number of channels of each transmission line, even when the recording pulse information to be transmitted from the signal processing unit to the laser diode driver (LDD) increases.

Second Embodiment

Figure 14:
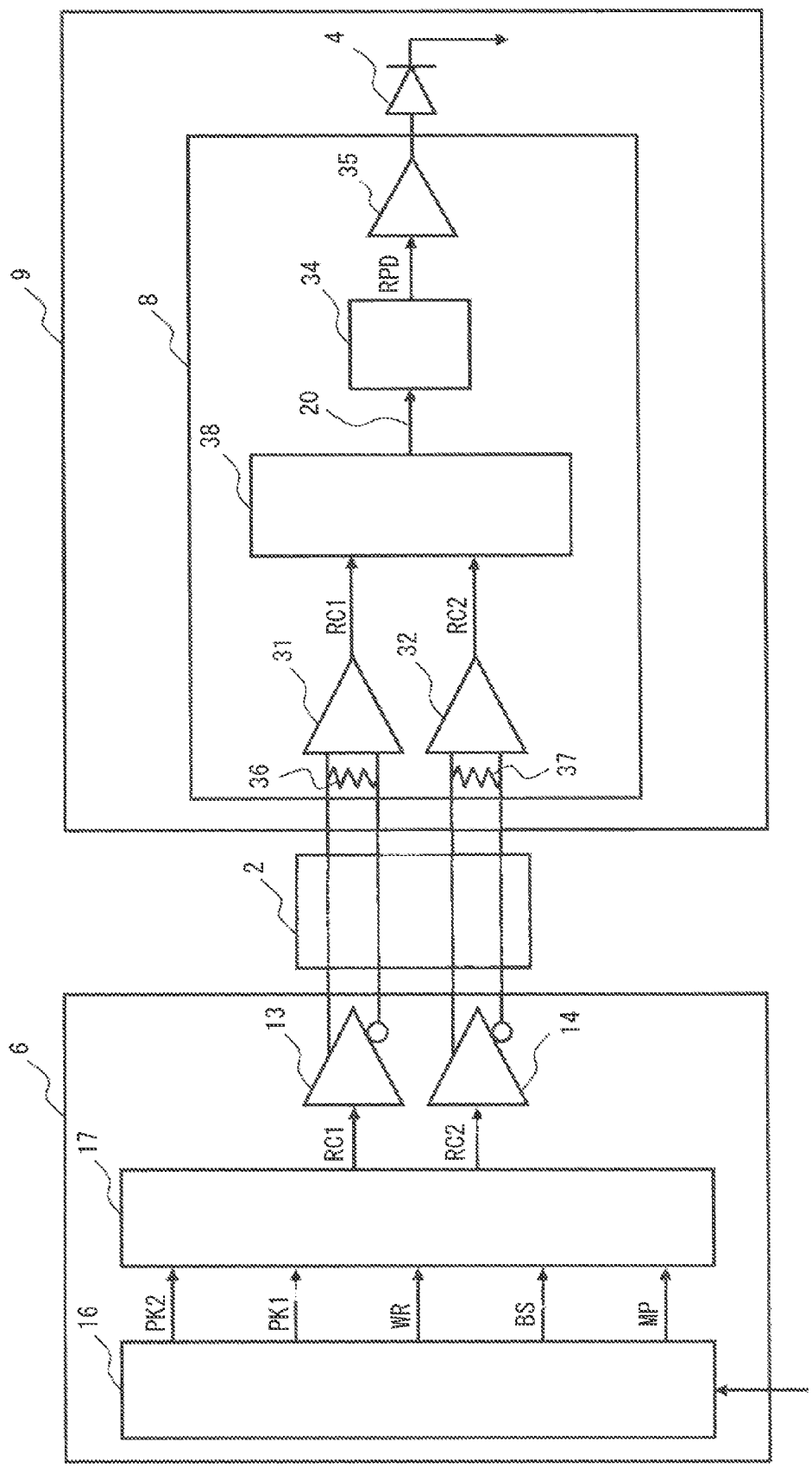
FIG. 14 is a block diagram showing an optical disk recording device according to a second embodiment.

Next, a second embodiment of the present invention will be described. FIG. 14 is a block diagram showing an optical disk recording device according to the second embodiment. The optical disk recording device according to the second embodiment is different from the optical disk recording device according to the first embodiment in that a recording code generation unit 17 generates a continuation code and the continuation code is used when a decoded code generation unit 38 generates a decoded code. The other components of the optical disk recording device according to the second embodiment are similar to those of the optical disk recording device according to the first embodiment. Accordingly, the same components are denoted by the same reference numerals and a redundant explanation is omitted.

The optical disk recording device according to the second embodiment shown in FIG. 14 includes a signal processing unit 6, the transmission line 2, and an optical pickup 9. The optical pickup 9 is equipped with a laser diode driver (LDD) 8 and the laser diode 4 driven by the LDD 8.

The signal processing unit 6 includes a recording pulse information generation unit 16, the recording code generation unit 17, and the low voltage differential signal (LVDS) transmission units 13 and 14.

Figure 16:
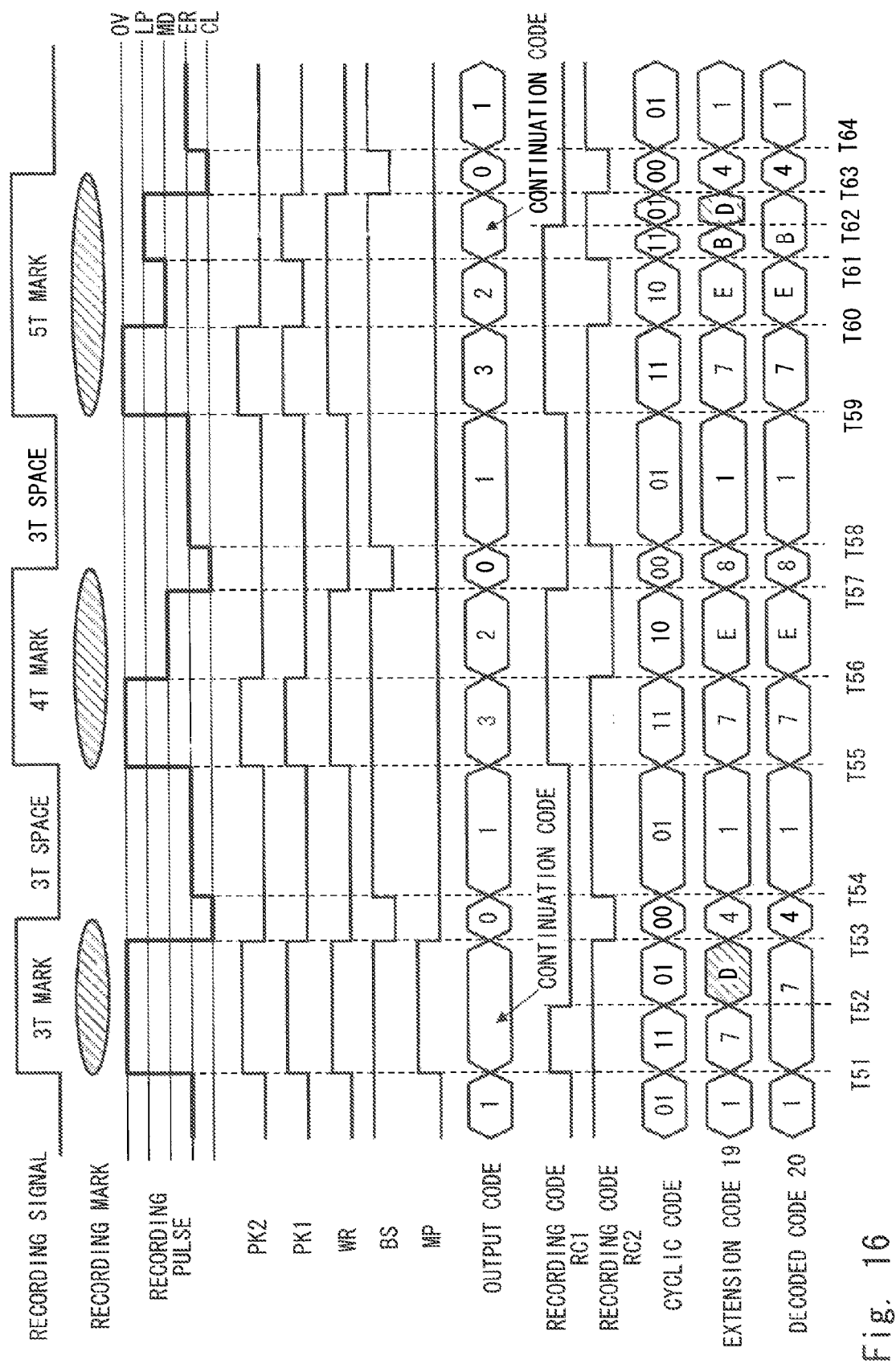
FIG. 16 is a timing diagram showing an operation of the optical disk recording device according to the second embodiment.

When a recording signal is supplied, the recording pulse information generation unit 16 generates recording pulse information items PK2, PK1, WR, BS, and MP respectively corresponding to power levels of laser light, and outputs the recording pulse information to the recording code generation unit 17. The term "recording signal" herein described refers to a signal which is supplied from an upper circuit (not shown) and is used to form a recording mark on a recording medium. FIG. 16 shows the shape of each recording mark formed on the recording medium and the recording signal supplied to the recording pulse information generation unit 16 during formation of each recording mark.

As shown in FIG. 16, the recording pulse information is a signal obtained by converting a recording pulse, which allows multi-valued power levels (OV, LP, MD, ER, CL; the number of power levels is five in this case) to be output, into 5-bit signals (PK2, PK1, WR, BS, MP). This recording pulse is generated using recording strategy technique. Specifically, as shown in FIG. 5, when the power level indicates "CL", the recording pulse information (PK2, PK1, WR, BS, MP) represents (0, 0, 0, 0, 0); when the power level indicates "ER", the recording pulse information represents (0, 0, 0, 1, 0); when the power level indicates "MD", the recording pulse information represents (0, 0, 1, 1, 0); when the power level indicates "OV", the recording pulse information represents (1, 1, 1, 1, 0) or (1, 1, 1, 1, 1); and when the power level indicates "LP", the recording pulse information represents (0, 1, 1, 1, 0).

Figure 15:
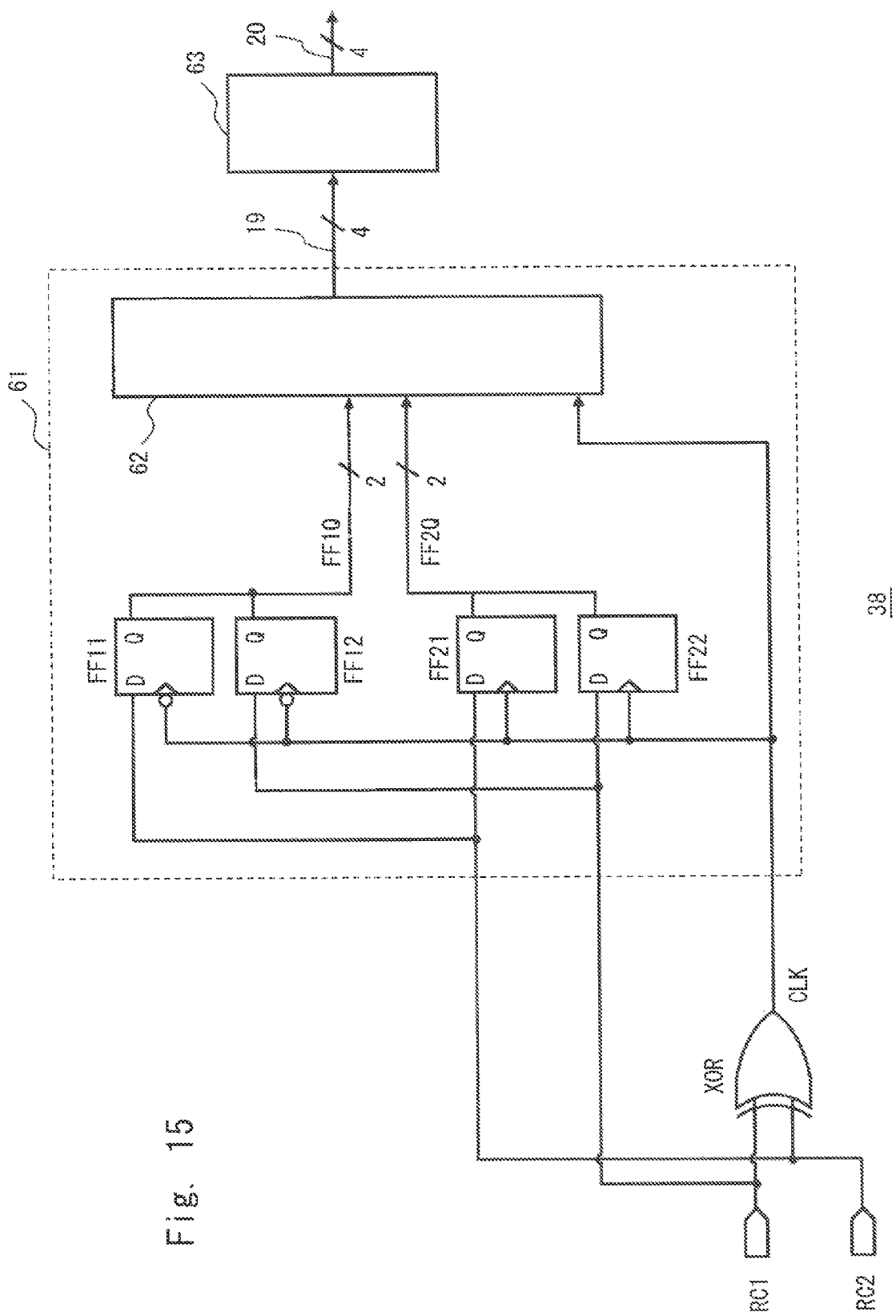
FIG. 15 is a circuit diagram showing a decoded cede generation unit included in the optical disk recording device according to the second embodiment.

The shape of the waveform of the recording pulse corresponding to the recording signal (4T Mark) shown in FIG. 15 is generally called an L-shape. Note that in the optical disk recording device according to the second embodiment, 5-bit information is used as an example of the recording pulse information generated by the recording pulse information generation unit 16. The number of bits of the recording pulse information is not limited thereto, but may be arbitrarily determined.

The recording code generation unit 17 generates the recording codes RC1 and RC2 by encoding the recording pulse information generated by the recording pulse information generation unit 16. For example, the recording code generation unit 17 is able to encode the recording pulse information with a number of bits smaller than the square root of the number of power levels. The optical disk recording device according to the second embodiment encodes the 5-bit recording pulse information PK2, PK1, WR, BS, and MP to thereby generate the 2-bit recording codes RC1 and RC2. In this case, a cyclic code (see FIG. 19) is used in which a transition of each power level (OV, LP, MD, ER, CL) is represented using a Gray code.

Further, in the optical recording device according to the second embodiment, output codes (output, code 0, output code 2, output code 3, and continuation code) respectively corresponding to toe power levels (OV, LP, MD, ER, CL) are allocated. Then, the recording code generation unit 17 generates the recording codes RC1 and RC2 corresponding to the respective output codes by using the table shown in FIG. 17, for example. Specifically, as shown in FIG. 17, when the power level is "CL", a recording code (0, 0) corresponding to an output code of "output code 0" is generated; when the power level is "ER", a recording code (0, 1) corresponding to an output code of "output code 1" is generated; when the power level is "MD", a recording code (1, 0) corresponding to an output code of "output code 2" is generated; when the power level is "OV", a recording code (1, 1) corresponding to an output code of "output code 3" or a recording code" (1, 1)→(0, 1)" corresponding to an output code of "continuation code" is generated; and when the power level "LP", a recording code "(1, 1)→(0, 1)" corresponding to an output code of "continuation code" is generated, herein, "(1, 1)→(0, 1)" indicates that (0, 1) is output after (1, 1).

Note that the table shown in FIG. 17 is illustrative only and the table shown in FIG. 18 can be generally used. In the table shown in FIG. 18, the value "0" or "1" may be used as "A" and "B" of the recording codes (RC1, RC2), Specifically, A="0" and B="0"; A="0" and. B="1"; A="1" and B="0"; or A="1" and B="1" can be used. Note that when A="0" and B="0" are used, the results are similar to those shown in the table shown in FIG. 17.

Figure 19:
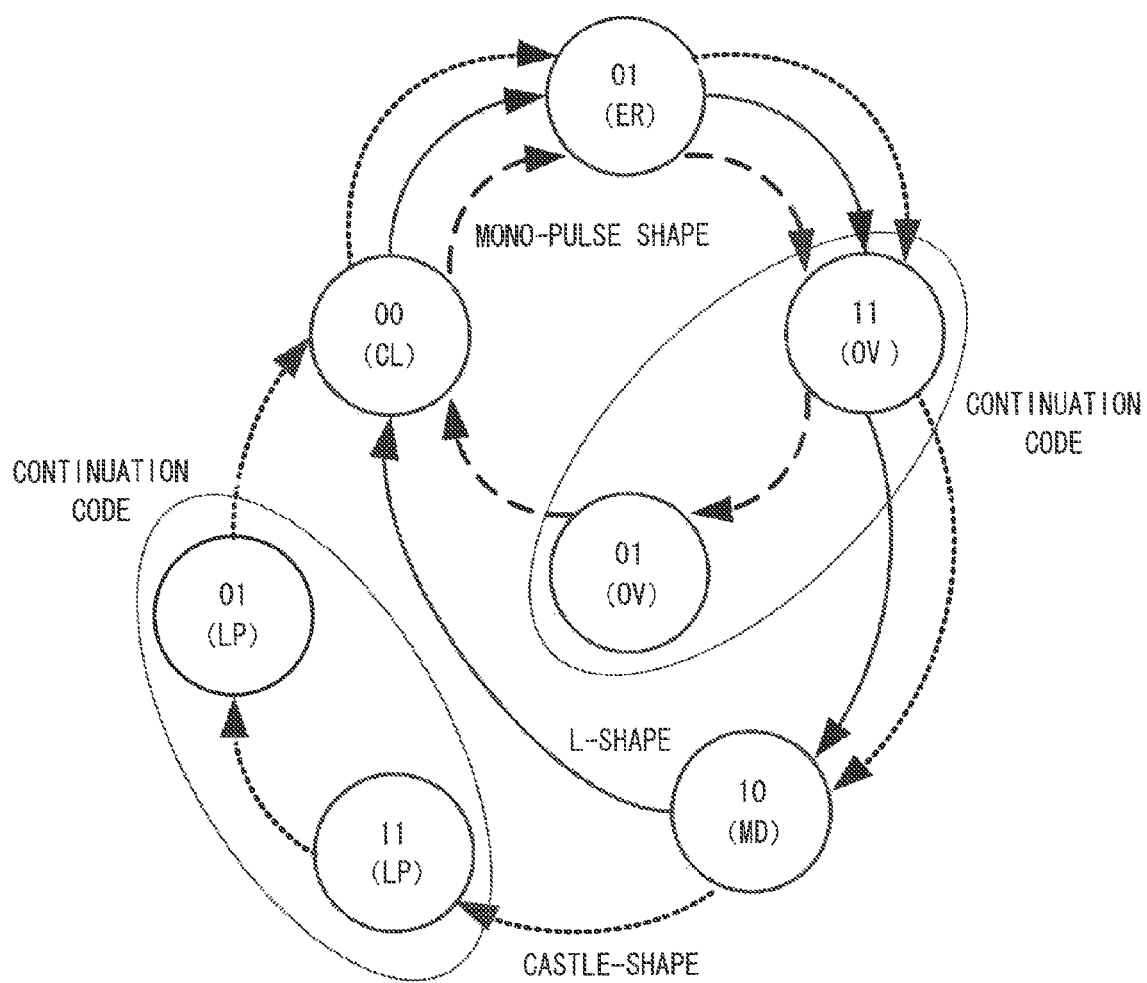
FIG. 19 is a diagram showing a cyclic code used in the optical disk recording device according to the second embodiment.
Figure 20:
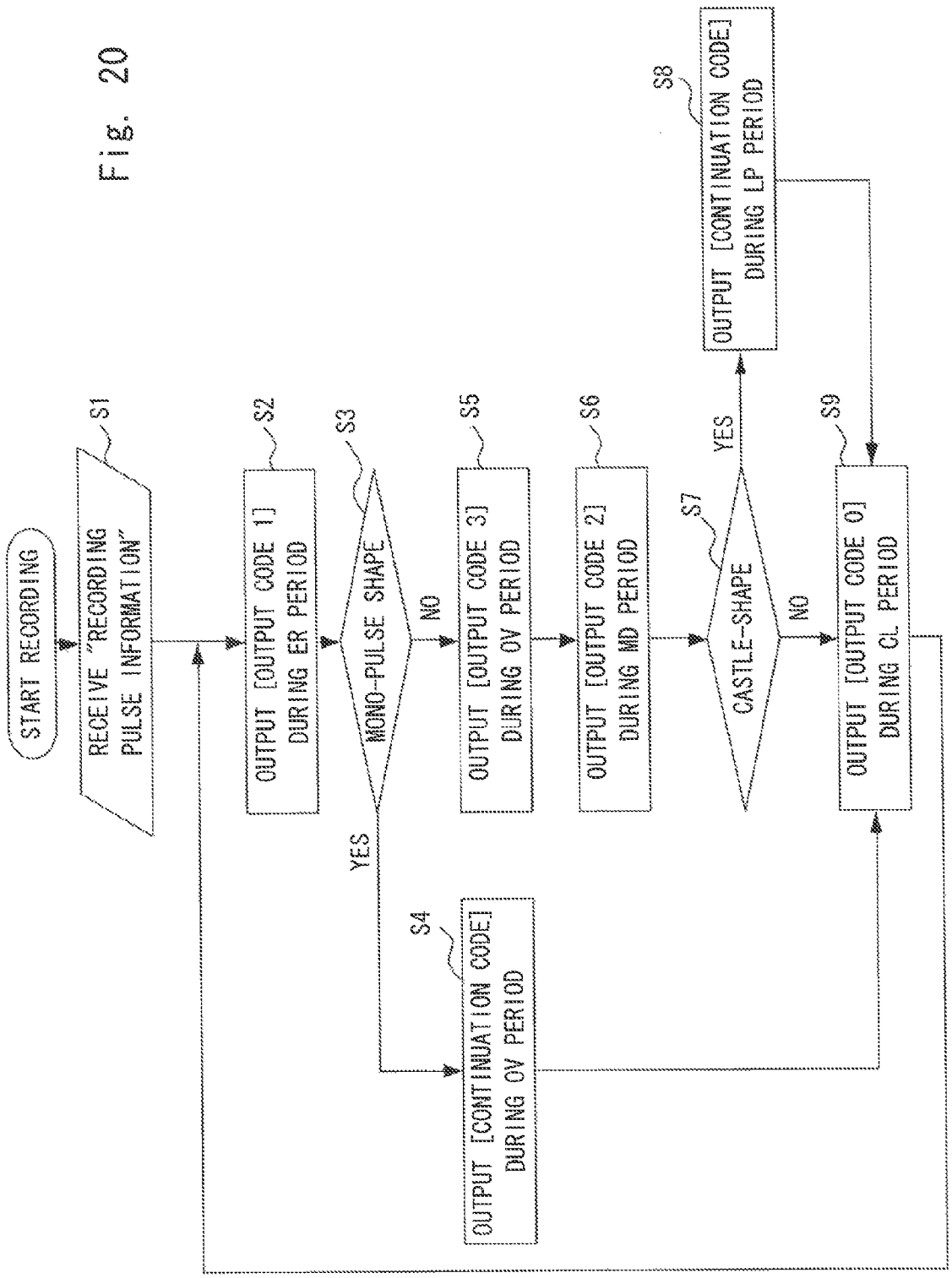
FIG. 20 is a flowchart showing an operation of a recording code generation unit included in the optical disk recording device according to the second embodiment.

FIG. 19 is a diagram showing a cyclic code used in the optical disk recording device according to the second embodiment. The recording code generation unit 17 outputs output codes (that is, recording codes) based on the cyclic code shown in FIG. 19. The operation at this time will be described with reference to the cyclic code shown in FIG. 19 and the flowchart shown in FIG. 20.

Now, description is given of the operation when the waveform of the recording pulse has a mono-pulse shape (corresponding to 3T Mark shown in FIG. 16). The recording code generation unit 17 receives the recording pulse information (step S1), and outputs "output code 1" during the period in which the power level is "ER" (step S2). Since the waveform of the recording pulse has a mono-pulse shape (step S3: Yes), the recording code generation unit 17 outputs "continuation code" during the period in which the power level is "OV" (step S4). After that, the recording code generation unit 17 outputs "output code 0" during the period in which the power level is "CL" (step S9).

Next, description is given of the operation when the waveform of the recording pulse has an L-shape (corresponding to 4T Mark shown in FIG. 16). The recording code generation unit 17 receives the recording pulse information (step S1), and outputs "output code 1" during the period in which the power level is "ER" (step S2). Since the waveform of the recording pulse has an L-shape (step S3: No), the recording code generation unit 17 outputs "output code 3" during the period in which the power level is "OV" (step S5). Next, the recording code generation unit 17 outputs "output code 2" during the period in which the power level is "MD" (step S6). Then, since the waveform of the recording pulse has an L-shape (step S7: No), the recording code generation unit 17 outputs "output code 0" during the period in which the power level is "CL" (step S9).

Next, description is given of the operation when the waveform of the recording pulse has a castle shape (corresponding to 5T Mark shown in FIG. 16). The recording code generation unit 17 receives the recording pulse information (step S1), and outputs "output code 1" during the period in which the power level is "ER" (step S2). Since the waveform of the recording pulse has a castle shape (step S3: No), the recording code generation unit 17 outputs "output code 3" during the period in which the power level is "OV" (step S5). Next, the recording code generation unit 17 outputs "output code 2" during the period in which the power level is "MD" (step S6). Then, since the waveform of the recording pulse has a castle shape (step S7: Yes), the recording code generation unit 17 outputs "continuation code" during the period in which the power level is "LP" (step S8). After that, the recording code generation unit 17 outputs "output code 0" during the period in which the power level is "CL" (step S9).

The recording codes RC1 and RC2 (that is, output codes) generated by the recording code generation unit 17 are supplied to the decoded code generation unit 38 via the LVDS transmission units 13 and 14, the transmission line 2, and the LVDS reception units 31 and 32.

The decoded code generation unit 38 decodes the transmitted recording code to thereby generate the decoded code 20. FIG. 15 is a circuit diagram showing an example of the decoded code generation unit 38. The decoded code generation unit 38 shown in FIG. 15 includes the clock generation unit XOR, a recording code holding unit 61, and a continuation code detection unit 63. The clock generation unit XOR may be composed of an exclusive OR circuit, for example. The clock generation unit XOR generates the clock CLK based on timings at which the recording codes RC1 and RC2 are received. Specifically, the clock generation unit XOR outputs "0" as the clock CLK when both the recording codes RC1 and RC2 indicate "1" or "0", and outputs "1" as the clock CLK when one of the recording codes RC1 and RC2 indicates "1" and the other indicates "0".

The recording code holding unit 61 holds the recording codes RC1 and RC2 received according to the clock CLK generated by the clock generation unit XOR, and outputs the held recording codes RC1 and RC2 as an extension code 19. The recording code holding unit 61 may be composed of the first flip-flops (FF11, FF12), the second flip-flops (FF21, FF22), and a switching unit 62.

The first flip-flops (FF11, FF12) are driven by a falling edge of the clock CLK generated by the clock generation unit XOR and hold the recording codes RC1 and RC2, and then output the held recording codes RC1 and RC2 to the switching unit 62. The held recording codes RC1 and RC2 are held until the subsequent falling edge of the clock CLK.

The second flip-flops (FF21, FF22) are driven by a rising edge of the clock CLK generated by the clock generation unit XOR and hold one recording codes RC1 and RC2, and then output the held recording codes RC1 and RC2 to the switching unit 62. The held recording codes RC1 and RC2 are held until the subsequent rising edge of the clock CLK.

The switching unit 62 switches the sequence of the held code FF1Q, which is output from the first flip-flops (FF11, FF12), and the held code FF2Q, which is output from the second flip-flops (FF21, FF22), according to the clock CLK, and outputs the held code FF1Q and the held code FF2Q, the sequence of which has been switched, as the extension code 19. At this time, the held code FF1Q and the held code FF2Q are 2-bit data strings, and the extension code 19 is a 4-bit data string.

Specifically, when the clock CLK indicates "0", the switching unit 62 allocates the held code FF2Q to the upper two bits and allocates the held code FF1Q to the lower two bits, and then outputs them as the extension code 19. On the other hand, when the clock CLK indicates "1", the switching unit 62 allocates the held code FF1Q to the upper two bits and allocates the held code FF2Q to the lower two bits, and then outputs them as the extension code 19.

Figure 21:
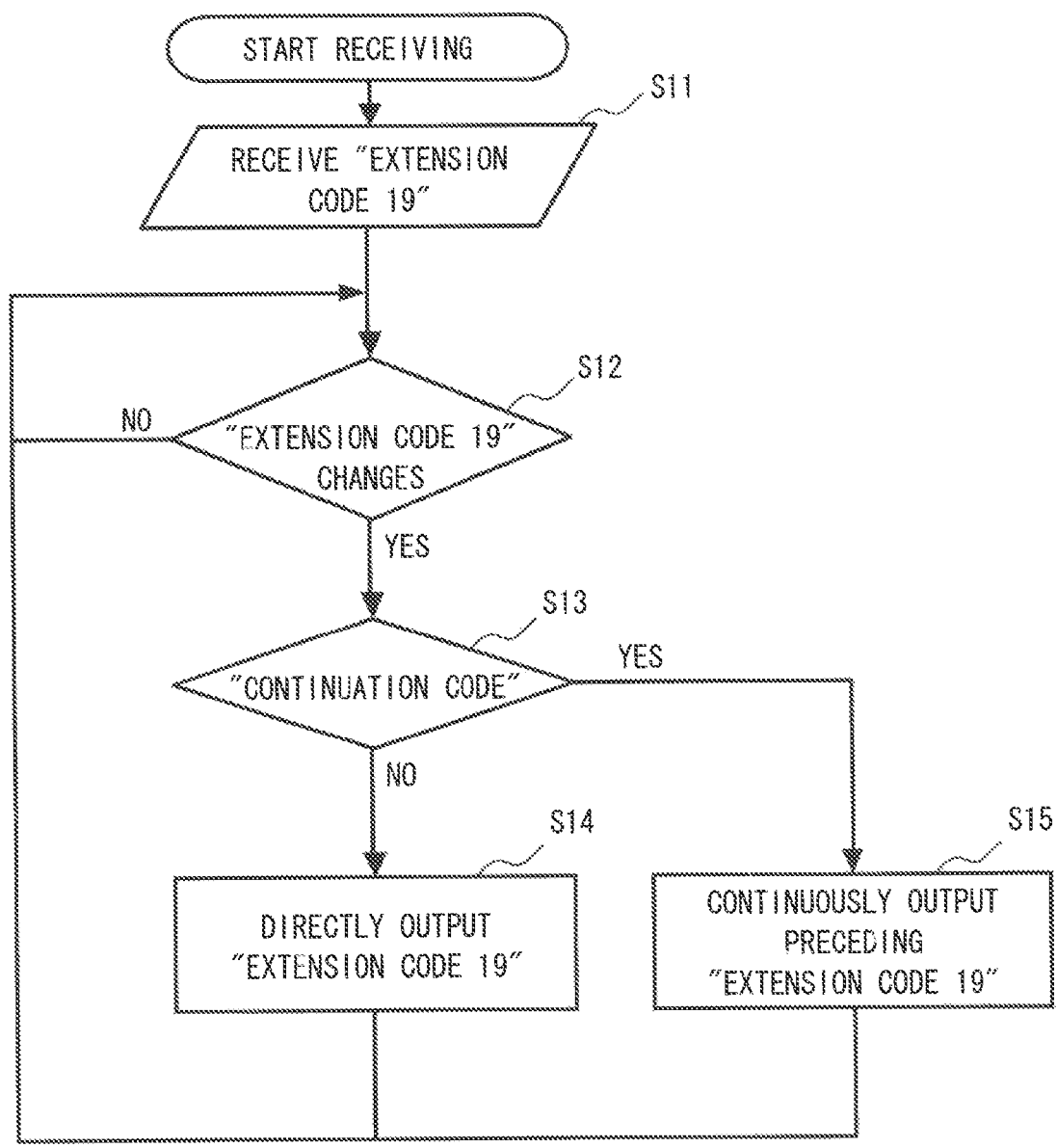
FIG. 21 is a flowchart showing an operation of a continuation code detection unit included in the optical disk recording device according to the second embodiment.
Figure 23:
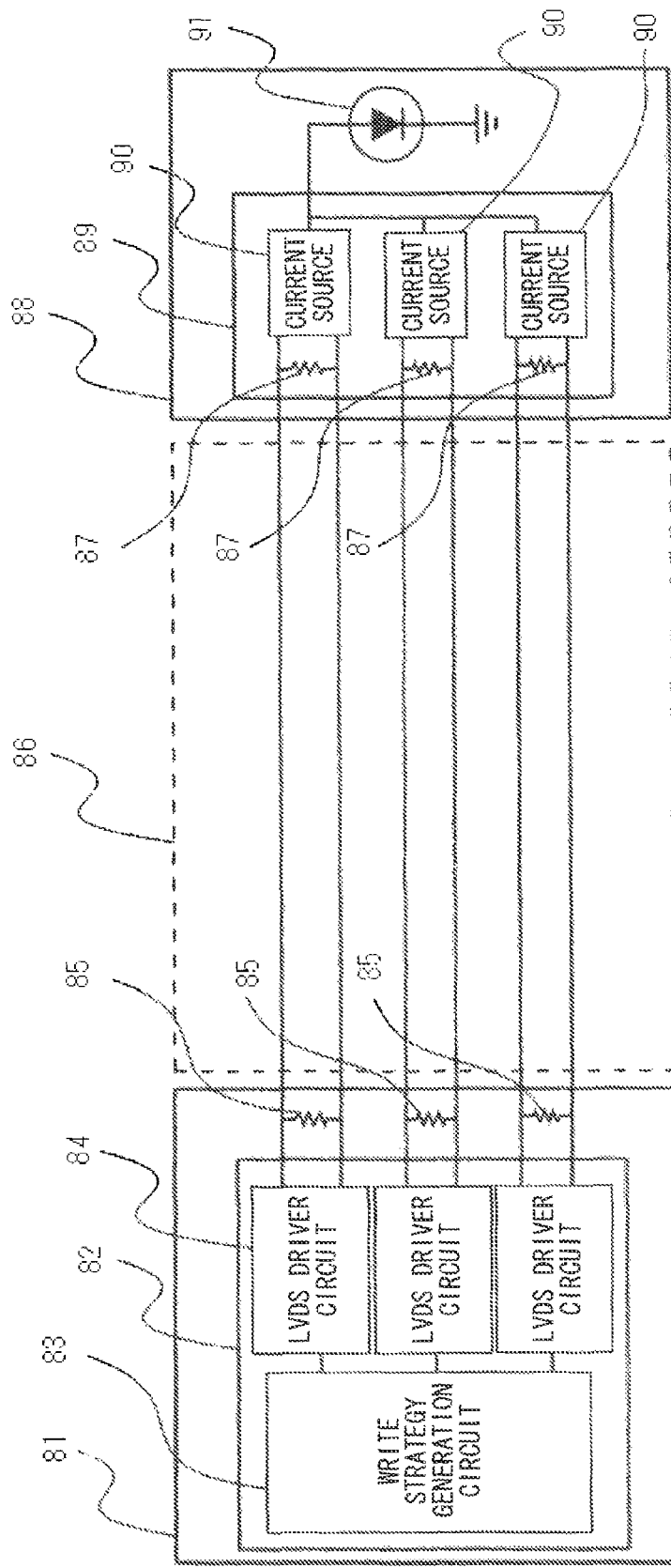
FIG. 23 is a diagram illustrating a technique disclosed in Japanese unexamined Patent Application Publication No. 2009-99233.

The continuation code detection unit 63 receives the extension code 19 output from the switching unit 62, and generates the decoded code 20 based on the extension code 19. FIG. 21 is a flowchart illustrating the operation of the continuation code detection unit 63. The continuation code detection unit 63 receives the extension code 19 (step S11), and detects whether the extension code 19 is changed or not (step S12). When the received extension code 19 is changed (step S12: Yes), the continuation code detection unit 63 detects whether the received extension code 19 is a continuation code (step S13). When the received extension code 19 is not a continuation code (step S13: No), the received extension code 19 is directly output as the decoded code 20 (step S14). On the other hand, when the received extension code 19 is a continuation code (step S13: Yes), specifically, when the extension code 19 represents (1, 1, 0, 1) ("D" in hexadecimal notation), the previous extension code 19 is continuously output as the decoded code 20 (step S15). FIG. 22 is a table showing relations among the extension code 19, the decoded code 20, and the power level.

For example, at T51 in FIG. 16, the extension code 19 represents (0, 1, 1, 1) ("7" in hexadecimal notation), and thus the continuation code detection unit 63 determines that the extension code 19 is not a continuation code (step S13: No). Accordingly, the continuation code detection unit 63 directly outputs "7" of the received extension code 19 as the decoded code 20 (step S14). On the other hand, at T52 in FIG. 16, the extension code 19 represents (1, 1, 0, 1) ("D" in hexadecimal notation), and thus the continuation code detection unit 63 determines that the extension code 19 is a continuation code (step S13: Yes). In this case, the continuation code detection unit 63 continuously outputs "7" of the previous extension code 19 as the decoded code 20 (step S15).

Next, the operation of the optical disk recording device according to the second embodiment will be described with reference to the timing diagram shown in FIG. 16. In the timing diagram shown in FIG. 16, a mono-pulse-shaped recording pulse is used to form the recording mark corresponding to the recording signal (3T Mark); an L-shaped recording pulse is used to form the recording mark corresponding to the recording signal (4T Mark); and a castle-shaped recording pulse is used to form the recording mark corresponding to the recording signal (5T Mark).

Now, description is given of the operation when the recording mark corresponding to the recording signal (3T Mark) is formed using the mono-pulse-shaped recording pulse. In the case of the mono-pulse-shaped recording pulse, the cyclic code and the power level transit in the order of ER (01)→OV (11)→OV (01)→CL (00)→ER (01) as shown in the cyclic code of FIG. 19.

At T51, the power level of the recording pulse shifts from "ER" to "OV". Accordingly, the recording pulse information generation unit 16 shown in FIG. 14 outputs the recording pulse information (PK2, PK1, WR, BS, MP) representing (1, 1, 1, 1, 1) to the recording code generation unit 17. The recording code generation unit 17 converts the recording pulse information into an output code (in this case, "continuation code") by using the table shown in FIG. 17, and outputs the recording code (1, 1) corresponding to the first half code of the "continuation code". At this time, the cyclic code is "11". The recording codes RC1 and RC2 are supplied to the decoded code generation unit 32 via the LVDS transmission units 13 and 14, the transmission line 2, and the LVDS reception units 31 and 32.

Since RC1="1" and RC2="1", the clock generation unit XOR of the decoded code generation unit 38 shown in FIG. 15 outputs the clock CLK="0" (falling). At the timing of a falling edge of the clock CLK, the first flip-flops (FF11, FF12) hold the recording codes RC1="1" and RC2="1" as the held code FF1Q="11" and output the held code FF1Q="11" to the switching unit 62.

Since the clock CLK="0" (falling), the switching unit 62 allocates the held code FF2Q="01" to the upper two bits and allocates the held code FF1Q="11" to the lower two bits, and then outputs (0, 1, 1, 1) ("7" in hexadecimal notation) as the extension code 19. The continuation code detection unit 63 receives the extension code 19 output from the switching unit 62, and detects whether the extension code 19 is the continuation code (1, 1, 0, 1) ("D" in hexadecimal notation) or not. In this case, since the extension code 19 represents represents (0, 1, 1, 1) ("7" in hexadecimal notation) and thus is not the continuation code, the continuation code detection unit 63 directly outputs the received extension code 19 as the decoded code 20. Note that, in this case, only the first half of the "continuation code" is transmitted, so that the continuation code detection unit 63 does not detect the continuation code.

The power level selection unit 34 outputs the power data corresponding to the decoded code 20 output from the decoded code generation unit 38. The DAC 35 converts the power data selected by the power level selection unit 34 into a laser drive current, and supplies the drive current to the laser diode 4. The laser diode 4 irradiates the recording medium with laser light of the power level corresponding to the drive current output from the DAC 35.

At T52, the output code is "continuation code". Accordingly, the recording code generation unit 17 outputs the recording code (0, 1) corresponding to the latter half of the "continuation code". At this time, the cyclic code is "01". The recording codes RC1 and RC2 are supplied to the decoded code generation unit 38 via the LVDS transmission units 13 and 14, the transmission line 2, and the LVDS reception units 31 and 32.

Since RC1="0" and RC2="1", the clock generation unit XOR of the decoded code generation unit 38 shown in FIG. 15 outputs the clock CLK="1" (rising). The second flip-flops (FF21, FF22) hold the recording codes RC1="0" and RC2="1" as the held code FF2Q="01" at the timing of a rising edge of the clock CLK, and output the held code FF2Q="01" to the switching unit 62.

Since the clock CLK="1" (rising), the switching unit 62 allocates the held code FF1Q="11" to the upper two bits and allocates the held code FF2Q="01" to the lower two bits, and then outputs (1, 1, 0, 1) ("D" in hexadecimal notation) as the extension code 19. The continuation code detection unit 63 receives the extension code 19 output from the switching unit 62. Then, since the received extension code 19 is the continuation code (1, 1, 0, 1) ("D" in hexadecimal notation), the continuation code detection unit 63 continuously outputs the previous extension code 19 representing (0, 1, 1, 1) ("7" in hexadecimal notation) as the decoded code 20.

The power level selection unit 34 outputs the power data corresponding to the decoded code 20 output from the decoded code generation unit 38. The DAC 35 converts the power data selected by the power level selection unit 34 into a laser drive current, and supplies the drive current to the laser diode 4. The laser diode 4 irradiates the recording medium with laser light of the power level corresponding to the drive current output from the DAC 35.

At T53, the power level of the recording pulse shifts from "OV" to "CL". Accordingly, the recording pulse information generation unit 16 shown in FIG. 14 outputs the recording pulse information (PK2, PK1, WR, BS, MP) representing (0, 0, 0, 0, 0) to the recording code generation unit 17. The recording code generation unit 17 converts the recording pulse information into an output code (in this case, "output code 0") by using the table shown in FIG. 17, and outputs (0, 0) as the recording codes RC1 and RC2 corresponding to the "output code 0". At this time, the cyclic code is "00". The recording codes RC1 and RC2 are supplied to the decoded code generation unit 38 via the LVDS transmission units 13 and 14, the transmission line 2, and the LVDS reception units 31 and 32.

Since RC1="0" and RC2="0", the clock generation unit XOR of the decoded code generation unit 38 shown in FIG. 15 outputs the clock CLK="0" (falling). At the timing of a failing edge of the clock CLK, the first flip-flops (FF11, FF12) hold the recording codes RC1="0" and RC2="0" as the held code FF1Q="00", and output the held code FF1Q="00" to the switching unit 62.

Since the clock CLK="0" (falling), the switching unit 62 allocates the held code FF2Q="01" to the upper two bits and allocates the held code FF1Q="00" to the lower two bits, and then outputs (0, 1, 0, 0) ("4" in hexadecimal notation) as the extension code 19. The continuation code detection unit 63 receives the extension code 19 output from the switching unit 62, and detects whether the extension code 19 is a continuation code (1, 1, 0, 1) ("D" in hexadecimal notation). In this case, since the extension code 19 is not the continuation code, the continuation code detection unit 63 directly outputs the received extension code 19 as the decoded code 20.

The power level selection unit 34 outputs the power data corresponding to the decoded code 20 output from the decoded code generation unit 38. The DAC 35 converts the power data selected by the power level selection unit 34 into a laser drive current, and supplies the drive current to the laser diode 4. The laser diode 4 irradiates the recording medium with laser light of the power level corresponding to the drive current output from the DAC 35.

At T54, the power level of the recording pulse shifts from "CL" to "ER". Accordingly, the recording pulse information generation unit 16 shown in FIG. 14 outputs the recording pulse information (PK2, PK1, WR, BS, MP) representing (0, 0, 0, 1, 0) to the recording code generation unit 17. The recording code generation unit 17 converts the recording pulse information into an output code (in this case, "output code 1") by using the table shown in FIG. 17, and outputs (0, 1) as the recording codes RC1 and RC2 corresponding to the "output code 1". At this time, the cyclic code is "01". The recording codes RC1 and RC2 are supplied to the decoded code generation unit 38 via the LVDS transmission units 13 and 14, the transmission line 2, and the LVDS reception units 31 and 32.

Since RC1="0" and RC2="1", the clock generation unit XOR of the decoded code generation unit 38 shown in FIG. 15 outputs the clock CLK="1" (rising). The second flip-flops (FF21, FF22) hold the recording codes RC1="0" and RC2="1" as the held code FF2Q="01" at the timing of a rising edge of the clock CLK, and output the held code FF2Q="01" to the switching unit 62.

Since the clock CLK="1" (rising), the switching unit 62 allocates the held code FF1Q="00" to the upper two bits and allocates the held code FF2Q="01" to the lower two bits, and then outputs (0, 0, 0, 1) ("1" in hexadecimal notation) as the extension code 19. The continuation code detection unit 63 receives the extension code 19 output from the switching unit 62, and detects whether the extension code 19 is the continuation code (1, 1, 0, 1) ("D" in hexadecimal notation). In this case, since the extension code 19 is not the continuation code, the continuation code detection unit 63 directly outputs the received extension code 19 as the decoded code 20.

The power level selection unit 34 outputs the power data corresponding to the decoded code 20 output from the decoded code generation unit 38. The DAC 35 converts the power data selected by the power level selection unit 34 into a laser drive current, and supplies the drive current to the laser diode 4. The laser diode 4 irradiates the recording medium with laser light of the power level corresponding to the drive current output from the DAC 35.

The optical disk recording device according to the second embodiment enables formation of the recording mark corresponding to the recording signal (3T Mark) using the monopulse-shaped recording pulse by the operation described above.

In the case of the L-shaped recording pulse corresponding to the recording signal (4T Mark) (corresponding to T55 to T58 in FIG. 16), the cyclic code and the power level transit in the order of ER (01)→OV (11)→OV (01)→CL (00)→ER (01), as shown in the cyclic code of FIG. 19. In the case of the castle-shaped recording pulse corresponding to the recording signal (5T Mark) (corresponding to T59 to T64 in FIG. 16), the cyclic code and the power level transit in the order of ER (01)→OV (11)→MD (10)→LP (11)→LP (01)→CL (00)→ER (01), as shown in the cyclic code of FIG. 19. Also in these cases, the operation is similar to that for the recording pulse of the recording signal (3T Mark) described above, so a redundant explanation is omitted.

In the optical disk recording device according to the second embodiment described above, the decoded code 20 is generated using the cyclic code shown in FIG. 19, as well as the previous recording code representing the state of the preceding power level. Further, when a continuation code is used and the continuation code is detected by the continuation code detection unit 63, the decoded cede is generated such that the preceding power level is continuously generated. Therefore, the use of the optical disk recording device according to the second embodiment enables reduction in the number of bits of a signal upon transmission of the signal through the transmission line 2.

At present, various recording media are commercially available, and thus the materials and characteristics of recording films forming recording marks are diversified. Additionally, in view of the recording rate, the recording environments (temperature etc.), and the type of the pickup for emitting laser light, recording using various recording pulses (power level, pulse interval) is required.

In the optical disk recording device according to the second embodiment, the number of recording patterns of recording pulses can be increased, thereby enabling recording onto various recording media.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An optical disk recording device that records information corresponding to a recording signal onto a recording medium by using laser light, the optical disk recording device comprising:
    a recording pulse information generation unit that generates, from the recording signal, recording pulse information corresponding to a power level of the laser light;
    a recording code generation unit that generates a recording code by encoding the recording pulse information;
    a transmission line that transmits the recording code; and
    a decoded code generation unit that generates a decoded code by decoding the recording code transmitted,
    wherein the recording code generation unit generates the recording code based on a cyclic code representing each transition of the power level by using a Gray code,
    wherein the decoded code generation unit decodes the recording code using a recording code corresponding to a power level at a predetermined timing and a recording code corresponding to a power level immediately prior to the power level at the predetermined timing, and
    wherin the number of bits of the recording code is smaller than a square root of the number of power levels of the laser light.

2. The optical disk recording device according to claim 1, further comprising a power level selection unit that selects a power level corresponding to the decoded code.

3. The optical disk recording device according to claim 1, wherein
    the decoded code generation unit comprises:
        a clock generation unit that generates a clock based on a timing where each recording code is received; and
        a recording code holding unit that holds each recording code received according to the clock, and outputs each recording code held, as the decoded code.

4. The optical disk recording device according to claim 3, wherein
    the recording code holding unit comprises:
        a first flip-flop that is driven by a falling edge of the clock, holds the recording codes, and outputs each recording code held;
        a second flip-flop that is driven by a rising edge of the clock, holds each recording code, and outputs each recording code held; and
        a switching unit that switches a sequence of each recording code according to the clock, each recording code being output from the first and second flip-flops.

5. The optical disk recording device according to claim 4, wherein
    at a falling edge of the clock, the switching unit allocates each recording code output from the second flip-flop to high-order bits, and allocates each recording code output from the first flip-flop to low-order bits, and
    at a rising edge of the clock, the switching unit allocates the recording codes output from the first flip-flop to high-order bits, and allocates the recording codes output from the second flip-flop to low-order bits.

6. The optical disk recording device according to claim 1, wherein
    the recording code generation unit is configured to be able to output a continuation code by using the recording code, the continuation code indicating that a preceding power level is continuously output, and
    the decoded code generation unit outputs the decoded code corresponding to the preceding power level upon detection of the continuation code.

7. The optical disk recording device according to claim 6, wherein
    the decoded code generation unit comprises:
        a clock generation unit that generates a clock based on a timing at which each recording code is received;
        a recording code holding unit that holds each recording code received according to the clock, and outputs each recording code held, as an extension code; and
        a continuation code detection unit that receives the extension code, outputs, as the decoded code, the extension code corresponding to the preceding power level upon detection of the continuation code in the extension code, and outputs the extension code as the decoded code when the continuation code is not detected in the extension code.

8. The optical disk recording device according to claim 1, further comprising:
    a signal processing unit that includes the recording pulse information generation unit and the recording code generation unit; and
    an optical pickup including: a laser diode driver that includes the decoded code generation unit; and a laser diode that emits the laser light, the optical pickup being configured to be accessible to any location in the recording medium,
    wherein a flexible cable is used as the transmission line that connects the signal processing unit and the optical pickup.

9. The optical disk recording device according to claim 1, wherein
    the recording pulse information includes:
        information corresponding to a waveform shape indicating one power level of the laser light upon recording onto the recording medium;
        information corresponding to a waveform shape indicating two power levels of the laser light upon recording onto the recording medium; and
        information corresponding to a waveform shape indicating three power levels of the laser light upon recording onto the recording medium.

10. The optical disk recording device according to any one of claim 1, wherein when the recording pulse information generated by the recording pulse information generation unit is a 5-bit data string, the encoded recording code is a 2-bit data string.

11. A recording data transmission method for an optical disk recording device that records information corresponding to a recording signal onto a recording medium by using laser light, the recording data transmission method comprising:
    generating, from the recording signal, recording pulse information corresponding to a power level of the laser light;

generating a recording code obtained by encoding the recording pulse information, based on a cyclic code representing each transition of the power level by using a Gray code;

transmitting the recording code; and generating a decoded code by decoding the recording code transmitted, by using a recording code corresponding to a power level at a predetermined timing and a recording code corresponding to a power level immediately prior to the power level at the predetermined timing, wherein the number of bits of the recoreing code is smaller than a square root of the number of power levels of the laser light.

12. The recording data transmission method according to claim 11, further comprising selecting a power level corresponding to the decoded code.

13. The recording data transmission method according to claim 11, wherein the generation of the decoded code comprises:

generating a clock based on a timing at which each recording code is received; and holding each recording code received according to the clock, and outputting each recording code held, as the decoded code.

14. The recording data transmission method according to claim 11, further comprising:

outputting, as the recording code, a continuation code representing that the preceding power level is continuously output; and outputting the decoded code corresponding to the preceding power level when the continuation code is detected upon decoding of the recording code.

15. The recording data transmission method according to claim 14, wherein the generation of the decoded code comprises:

generating a block based on a timing at which each recording code is received;

holding each recording code received according to the clock, and outputting each recording code held, as an extension code; and outputting an extension code corresponding to the preceding power level as the decoded code when the continuation code is detected in the extension code, and outputting the extension code as the decoded when the continuation code is not detected in the extension code.

16. An optical disk recording device that records information corresponding to a recording signal onto a recording medium by using laser light, the optical disk recording device comprising:

a recording pulse information generation unit that generates, from the recording signal, recording pulse information corresponding to a power level of the laser light;

a recording code generation unit that generates a recording code by encoding the recording pulse information;

a transmission line that transmits the recording code; and a decoded code generation unit that generates a decoded code by decoding the recording code transmitted, wherein the recording code generation unit generates the recording code based on a cyclic code representing each transition of the power level by using a Gray code, wherein the decoded code generation unit decodes the recording code using a recording code corresponding to a power level at a predetermined timing and a recording code corresponding to a power level immediately prior to the power level at the predetermined timing, and wherein the recording code generation unit is configured to be able to output a continuation code by using the recording code, the continuation code indicating that a preceding power level is continuously output, and the decoded code generation unit outputs the decoded code corresponding to the preceding power level upon detection of the continuation code.

17. The optical disk recording device according to claim 16, further comprising a power level selection unit that selects a power level corresponding to the decoded code.

18. The optical disk recording device according to claim 16, wherein the decoded code generation unit comprises:

a clock generation unit that generates a clock based on a timing where each recording code is received; and a recording code holding unit that holds each recording code received according to the clock, and outputs each recording code held, as the decoded code.

19. The optical disk recording device according to claim 18, wherein the recording code holding unit comprises:

a first flip-flop that is driven by a falling edge of the clock, holds the recording codes, and outputs each recording code held;

a second flip-flop that is driven by a rising edge of the clock, holds each recording code, and outputs each recording code held; and a switching unit that switches a sequence of each recording code according to the clock, each recording code being output from the first and second flip-flops.

20. The optical disk recording device according to claim 19, wherein at a falling edge of the clock, the switching unit allocates each recording code output from the second flip-flop to high-order bits, and allocates each recording code output from the first flip-flop to low-order bits, and at a rising edge of the clock, the switching unit allocates the recording codes output from the first flip-flop to high-order bits, and allocates the recording codes output from the second flip-flop to low-order bits.

21. The optical disk recording device according to claim 16, wherein the decoded code generation unit comprises:

a clock generation unit that generates a clock based on a timing at which each recording code is received;

a recording code holding unit that holds each recording code received according to the clock, and outputs each recording code held, as an extension code; and a continuation code detection unit that receives the extension code, outputs, as the decoded code, the extension code corresponding to the preceding power level upon detection of the continuation code in the extension code, and outputs the extension code as the decoded code when the continuation code is not detected in the extension code.

22. The optical disk recording device according to claim 16, further comprising:

a signal processing unit that includes the recording pulse information generation unit and the recording code generation unit; and an optical pickup including: a laser diode driver that includes the decoded code generation unit; and a laser diode that emits the laser light, the optical pickup being configured to be accessible to any location in the recording medium, wherein a flexible cable is used as the transmission line that connects the signal processing unit and the optical pickup.

23. The optical disk recording device according to claim 16, wherein
the recording pulse information includes:
information corresponding to a waveform shape indicating one power level of the laser light upon recording onto the recording medium;
information corresponding to a waveform shape indicating two power levels of the laser light upon recording onto the recording medium; and
information corresponding to a waveform shape indicating three power levels of the laser light upon recording onto the recording medium.

24. The optical disk recording device according to any one of claim 16, wherein when the recording pulse information generated by the recording pulse information generation unit is a 5-bit data string, the encoded recording code is a 2-bit data string.

\* \* \* \* \*